US009680778B2

(12) United States Patent
Merchant et al.

(10) Patent No.: US 9,680,778 B2
(45) Date of Patent: *Jun. 13, 2017

(54) SYSTEM AND METHOD USING A SIMPLIFIED XML FORMAT FOR REAL-TIME CONTENT PUBLICATION

(71) Applicant: S&P Global Inc., New York, NY (US)

(72) Inventors: Sameer Merchant, Glen Head, NY (US); Gerald Bueshel, Amagansett, NY (US); Jules Michael McLeod, Kingwood, TX (US); John Marshall, Clearwater, FL (US)

(73) Assignee: S&P Global Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/187,233

(22) Filed: Jun. 20, 2016

(65) Prior Publication Data
US 2016/0308806 A1 Oct. 20, 2016

Related U.S. Application Data

(63) Continuation of application No. 13/195,654, filed on Aug. 1, 2011, now Pat. No. 9,373,102.

(60) Provisional application No. 61/369,490, filed on Jul. 30, 2010.

(51) Int. Cl.
*H04L 12/58* (2006.01)
*G06Q 10/10* (2012.01)
*H04L 29/08* (2006.01)
*H04L 12/18* (2006.01)

(52) U.S. Cl.
CPC ......... *H04L 51/066* (2013.01); *G06Q 10/107* (2013.01); *H04L 12/1877* (2013.01); *H04L 12/1895* (2013.01); *H04L 51/30* (2013.01); *H04L 67/02* (2013.01); *H04L 12/1868* (2013.01)

(58) Field of Classification Search
CPC ............... H04L 51/066; H04L 12/1868; H04L 12/1877; H04L 12/1895
See application file for complete search history.

(56) References Cited

U.S. PATENT DOCUMENTS

| 6,542,912 | B2 | 4/2003 | Meltzer et al. |
| 7,321,939 | B1 | 1/2008 | Porter |
| 7,650,337 | B2 | 1/2010 | Cox |
| 2002/0091574 | A1 | 7/2002 | Lefebvre et al. |

(Continued)

*Primary Examiner* — Asad Nawaz
*Assistant Examiner* — Saad A Waqas
(74) *Attorney, Agent, or Firm* — Proskauer Rose LLP

(57) ABSTRACT

A system and method for delivering content in real-time using advanced messaging technology that reduces the risk of content being lost or dropped in transmission. The system and method utilize a custom, simplified XML format to deliver real-time textual, numeric, and metadata content directly to subscribers. The XML tag set specifies all of the information needed to package, process, and distribute real-time content messages and includes an advanced tagging structure that allows granular content customization. Messages are built on the fly using multi-channel data processing techniques. The XML delivery system and method offers an array of real-time market-specific page-based "Alert" services and aggregated newswires with accompanying real-time numeric data feeds. These feeds contain proprietary assessments and other price data across a broad spectrum of global and regional commodity markets, including oil, petrochemicals, metals, electric power, natural gas, coal, and risk.

19 Claims, 26 Drawing Sheets

(56) References Cited

U.S. PATENT DOCUMENTS

| | | |
|---|---|---|
| 2004/0230676 A1 | 11/2004 | Spivack et al. |
| 2005/0138019 A1 | 6/2005 | Betts et al. |
| 2007/0118601 A1 | 5/2007 | Pacheco |
| 2007/0136334 A1 | 6/2007 | Schleppenbach et al. |
| 2008/0115123 A1 | 5/2008 | Kelly et al. |
| 2009/0292773 A1 | 11/2009 | Leedberg et al. |

OUTPUT MESSAGE

```xml
<?xml version="1.0"?><!DOCTYPE MESSAGE SYSTEM "ewmw.dtd">
<message>
     <sendTo>CompanyName</sendTo>
     <sendDt>2008-02-01T10:54:15-05:00</sendDt>
     <service type="RealTime" releaseTime="2008-02-01T10:54:15-05:00"/>
     <service type="PlattsMarketData" releaseTime="2008-02-01T14:00:00-05:00"/>
     <num>
          <dataPoint symbol="P125NY2"
               permCode="NE,P1,P6"
               dataTime="2008-01-23T00:00:00-05:00"
               bate="u"
               trans="C">
          </dataPoint>
     </num>
</message>
```

FIG. 28

OUTPUT MESSAGE

```
<message>
    <sendTo>CompanyName</sendTo>
    <sendDt>2008-03-10T19:50:02-05:00</sendDt>
    <service type="RealTime" releaseTime="2008-03-10T19:50:02-05:00"/>

<headLine>27--Jet Kerosene Conversions Either Side of **
        </headLine>
        <textBody>New York (Platts)--10Mar08/0750 pm EDT/ 2350 GMT
C=Change from Prev. Day'sPrice !=Today's Price
              C      $BBL/$MT        C        C     CTS Gal            C
Singapore !  +1.59  124.37--124.41  +1.59         296.12**296.21
CIF/ARA    ! +1.50  1067.75--1068.75 +1.50        323.56**321.91
Rdam Barge ! +1.50  1074.00--1075.00 +1.50        325.45**323.80
FOB Med    !  ---    ------ ---      ---           ---** ---
USGulf/Wat !        1037.80**1039.46       +5.14  312.59--313.09    +5.14
USGulf/Pip !        1036.14**1037.80       +5.14  312.09--312.59    +5.14
Carib Car  ! +16.70 1020.79--1022.42       +16.71 316.03**316.54
NY Cargo   !        1042.27**1043.10       +2.64  315.84--316.09    +2.64
LA Pipe    !        1014.71**1016.30       +3.14  318.09--318.59    +3.14
Group 3    !        1023.69**1027.01       +2.64  308.34--309.34    +2.64
Chicago    !        1020.37**1023.69       +2.64  307.34--308.34    +2.64
        </textBody>
        <date>2008-03-10T19:50:02-05:00</date>
        <pageNumber>0027</pageNumber>
        <banner>--Platts Global Alert--</banner>
        <topic>PJ,ASI,EU,GM</topic> <!-- Platts topic -->
        <sid>6811658</sid>
        <cSource>PGA</cSource>
        <pCategory>FX</pCategory>

</message>
```

FIG. 29

SYSTEM AND METHOD USING A SIMPLIFIED XML FORMAT FOR REAL-TIME CONTENT PUBLICATION

RELATED APPLICATIONS

This application is a continuation of U.S. patent application Ser. No. 13/195,654, filed Aug. 1, 2011, now U.S. Pat. No. 9,373,102, which claims priority under 35 U.S.C. §119(e) to U.S. Provisional Application Ser. No. 61/369,490, filed Jul. 30, 2010, the entire disclosures of each of which are hereby incorporated by reference herein in their entireties.

FIELD OF THE INVENTION

The present invention relates to systems and methods of distributing information items, or content, to channel partners. More particularly, the present invention is directed to a system and method of receiving, packaging, and delivering XML, market data to a plurality of subscribers in real-time.

BACKGROUND OF INVENTION

Electronic content publication systems are used to publish digital information items to a plurality of subscribing entities. The publication systems provide information items to multiple, physically separate computerized devices over one or more digital computer networks. These information items may include textual, numeric, or other forms of data, such as, stock quotes, financial data, weather reports, news items, etc. These information, or content, publication systems may be used to disseminate information from a variety of electronic content providers to a variety of subscribing entities (subscribers, vendors, partners), via the internet or other communications networks.

Industry-standard price assessments are a critical element of short- and long-term commodities contracts worldwide. This information may be published in textual form along with news, market commentary, fundamental data and other useful content. Several product and delivery vehicles may be utilized, such as real-time page-based "Alert" services, as well as end-of-day newswires/newsletters, traditional print newsletters covering different industry segments, or network based content publication services.

There are a number of challenges that content publication systems must overcome. For example, incoming data must be formatted, in some instances combined, and then associated with the appropriate subscribers entitled to receive that data (known as "packaging" the data). With certain types of data it is critical that each subscriber receive the same data at substantially the same time. Additionally, content publication systems must be able to recognize and deal with failures in information delivery. Furthermore, subscribers do not use the data in the same ways or run the same types of platforms making establishing a standardized data format difficult.

Existing systems store incoming data for later retrieval and dissemination. At certain intervals, the data is retrieved, associated with the appropriate subscribers, and delivered to subscribers. However, existing systems do not receive multiple types of data and package and distribute it in real-time, i.e., package and distribute a message in response to the receipt of an input data massage. Further, in existing systems, critical market data may be lost or dropped before being delivered to subscribers, due to, for example, network errors or problems with subscribers' servers. In the event that market data cannot be delivered to a subscriber, existing systems do not have the capability to preserve the data until it can be delivered.

Accordingly, there exists a need for an improved system and method for reliably delivering market data to a plurality of subscribers in real-time.

BRIEF SUMMARY OF THE INVENTION

Aspects of the present invention relate to systems and methods for electronically distributing news, price information, and market data over the internet or other communications network in a simplified, extensible markup language (XML) format to a plurality of subscribers.

According to an embodiment of the present invention, a system is configured to receive textual and numeric content from at least one source, package the content for delivery to at least one of a plurality of subscribing entities, and publish or otherwise deliver the content via the internet or other communications network. Subscribing entities may include, for example, individual or corporate subscribers, partners, customers, news or information vendors, or any third party information recipient. Numeric content may include numerical analysis such as assessments and other data. For instance, numerical content may include closing market prices and fundamental statistical data as well as time-series data for charting or graphing. Textual content may include news, articles, market commentary, transactions, "market heard" pages, statistics tables, and proprietary assessment and fundamentals tables.

Preferably, the system comprises one or more computers configured to use a simplified XML tag set to deliver real-time textual and numeric content directly to subscribers in accordance with a real-time permissioning system. This custom tag set specifies all of the information needed to process, package, and distribute real-time content messages and includes an advanced tagging structure that allows granular content customization.

Embodiments of the present invention offer flexible, reliable and fast delivery of real-time content, including page-based "Alert" services, selected newswires, and proprietary real-time numeric data. These features may be accomplished by combining enterprise messaging technology with an XML message schema. According to one aspect of the invention, data is normalized through the use of at least one filter or flow process and delivered in a standardized format with enough flexibility to allow for future changes. The simple, clean message format of the present invention improves timeliness and reduces processing errors over legacy formats and guarantees messaging that reduces the risk of content being lost or dropped in transmission.

According to aspects of the present invention, the system and method process and package messages according to Execution Groups, which contain named groupings of message flows. A message flow may be understood as a sequence of nodes, which define the processing steps run by the delivery system of the present invention when an input message is received. For example, a node can represent the set of actions executed by a computer program or processor that define a processing step.

In accordance with another aspect of the invention, enterprise customers can directly ingest content into their workflow. Furthermore, the invention allows content to be streamed that has traditionally not been delivered by real-time platforms, thereby creating a single consolidated distribution platform for current and future content.

The present invention provides a real-time content distribution solution using advanced messaging technology that reduces the risk of content being lost or dropped in transmission.

In accordance with another aspect of the invention, an array of real-time market-specific page-based "Alert" services and aggregated newswires with accompanying real-time numeric data feeds are provided. These feeds contain proprietary assessments and other price data across a broad spectrum of global and regional commodity markets, including oil, petrochemicals, metals, electric power, natural gas, coal, and risk. This content may be delivered using one of three basic XML message formats—textual, numeric or metadata. Additional embodiments of the present invention include metadata and numeric analytics data feeds that include real-time and historic market data. These bulk data feeds provide customers greater flexibility on how and where to leverage the analytics content.

In accordance with another aspect of the invention, the source information comes from a content publication or generation system, which is used to publish information related to a wide range of markets. The source information is in a standardized format, typically XML 1.0, with a pre-defined set of tags. This information is routed to a delivery system over a communications network, such as an IP network via an IP based messaging protocol, then transformed and processed using a defined set of rules implemented in a rule based engine called a Transform Publish Filter (TPF). The delivery system may then distribute packaged content, or authorize the publication of content messages, based upon a set of distribution rules, such as a subscription permissioning system. For instance, message data, in a second format, usually XML 2.0, is forwarded to the Subscriber hosts over an IP network using the messaging protocol.

The design of the delivery system provides for 'end to end' global delivery, by leveraging standard messaging to deliver content via public networks. The message flow system leverages the messaging system to deliver the feed either over the public network or over a private network.

In accordance with another aspect of the invention, the TPF rule engine allows real-time application of textual and numeric Business Rules and changes. The message flow architecture allows for maintaining subscription details in real time by processing a permission file as designed by a fulfillment system. For example, a Load Permission File flow can process the permission file in real time whenever there is a change in the incoming permission file by processing the details and updating the database. The fulfillment system may be any external application that supplies a permission file, which may contain, for example, individual subscriber entitlement and package information. This information may be used by the TPF to permission, package, and distribute content in real-time.

In accordance with another aspect of the invention, the XML structure allows flexibility and agility to customize content in real-time. The message flow architecture allows for enabling or disabling certain tags for a specific partner and for customizing the content to different partners based on their subscription or preference information.

In accordance with another aspect of the invention, an XML delivery system allows for a complete audit trail, logging, and alert capability in real-time, end to end, up to the delivery point to the end user. For instance, a Send To Audit flow can capture the audit information and a Perfmon results flow can capture the performance details.

In accordance with another aspect of the invention, content is prioritized for optimal delivery. Different types of messages can be assigned different priorities by the message flow allowing the system to deliver the messages on specified criteria, such as message type or content, rather than in a "first in, first out" format. For example, Price or Numeric messages may be assigned a higher priority than Textual messages so that in the event that two messages are simultaneously being processed, the price or numeric message could be delivered first.

In accordance with another aspect of the invention, the XML structure described herein can function as an industry standard for commodity news and market data distribution. As will be described in greater detail below, the Document Type Definition (DTD) for the XML structure is unique, and structured to capture the necessary commodity news and market data.

In accordance with another aspect of the invention, compliance with the XML Standard may be enforced in real-time. The message flow can be configured to raise an exception if an XML message is not in accordance with XML standards. For example, an exception would be raised if an XML message were ill-formed XML without proper closing tags.

In accordance with another aspect of the invention, metadata is distributed at a desired frequency with all attributes necessary for data ingestion. A metadata flow publishes the price metadata as and when necessary. For example, metadata could be sent once a week or on a demand/need basis.

In accordance with another aspect of the invention, multiple data types can be processed simultaneously and yet maintain the order of sequence. Specifically, the message flow can process multiple data types in parallel, such as textual, price, and metadata, by filtering the incoming message type and routing them to their associated flows. A dedicated flow, such as a Check Content type flow, can accommodate this functionality.

In accordance with another aspect of the invention, the tag value code structure design and TPF rule engine together allow for content bundling in real-time. The content delivered to a subscriber can be customized with the ability to bundle only relevant information intended for a particular subscriber instead of sending all the content to all the subscribers. For instance, exemplary nodes "Build Textual data" and "Build Price data" can be configured to check the permissioning for each subscriber and identify the list of subscribers who would get the message. The nodes can also build the messages individually using the <sendTo> tag, with different values, such as: <sendTo>vendor1</sendTo>, <sendTo>vendor2</vendor2>, and <sendTo>vendor3</vendor3>, etc.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

FIG. 28 is an illustration of exemplary price output messages in accordance with an embodiment of the present invention.

FIG. 29 is an illustration of exemplary news story output messages in accordance with an embodiment of the present invention.

DETAILED DESCRIPTION OF THE INVENTION

In accordance with the present invention, the integration of multiple data types is supported. Multiple unique sets of numeric and textual data may be distributed using a similar structure but different tag sets.

For example, News & Pricing data contains assessments and other data such as closing market prices and fundamental statistical data and is typically distributed using a numeric message format. Use of a numeric message format can support, for example, storage of time-series data for charting, analysis, or other purposes.

Textual report messages may come in a variety of page sizes to support the distribution of news, market commentary, transactions, and proprietary assessment and fundamentals tables that are pertinent to a defined market. For legacy distribution requirements, a variable length format is used to distribute news articles, market commentary, and legacy newswires, and a fixed length format for proprietary assessment tables, statistical tables, and transaction or "market heard" pages.

In accordance with the present invention, at least two unique sets of metadata messages can be distributed and associated with these data types. For instance, a first for News & Pricing data and a second for Analytics data. Both message types include permissioning information along with symbol definitions and attributes that are vital to ingesting data. The metadata for Analytics content provides additional information for its associated numeric messages.

Figure 1:
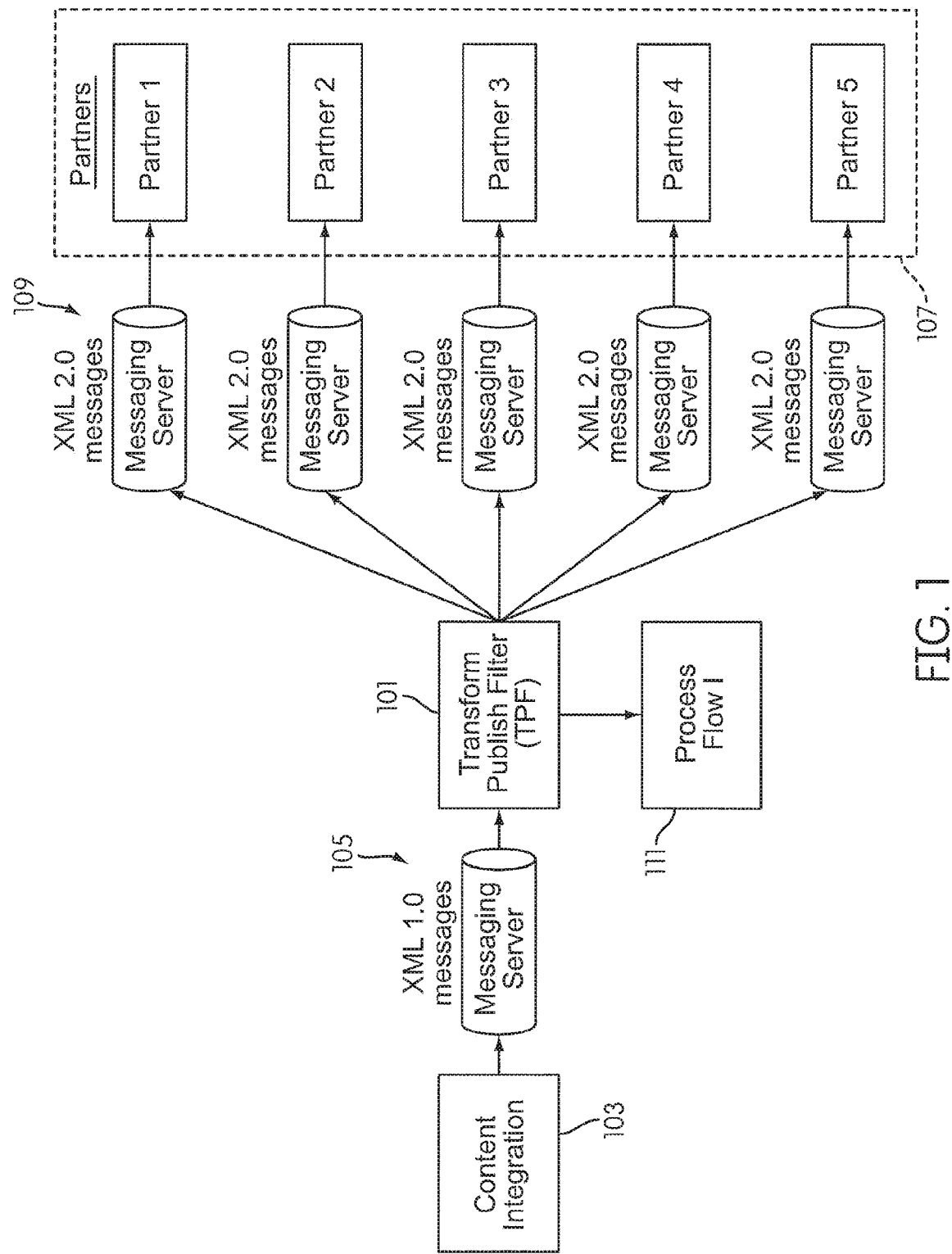
FIG. 1 is a logical diagram showing the transformation and publication of content to various partners according to an embodiment of the present invention.

In accordance with an embodiment of the present invention shown in FIG. 1, a rule-based engine known as a Transform Publish Filter engine (TPF) 101 is provided. The TPF may be implemented on one or more computers via, for instance, algorithms comprising computer-executable instructions stored on non-transitory computer-readable media. The TPF functions to process, transform and enrich different types of content, including numerical and textual data. Content is received from a content integration source 103 via a messaging server 105. Once the data has been transformed and processed by the TPF 101, the content is distributed to a plurality of vendors or partners 107 via a messaging server 109.

The TPF 101 applies as series of rules in Process Flow 111 when receiving, transforming, and publishing or otherwise distributing messages. For example, the TPF 101 may be configured to support multiple incoming message types and identify incoming message types through a dedicated flow which, for example, distinguishes between and appropriately routes textual, numeric, and meta data to appropriate nodes. Further, a flow of the TPF may set the message priority for delivery, transform the message to a Standard XML format, and format vendor specific content before delivery. Further, the TPF may include a flow to apply permission rules. For instance, the applied permission rules may be based on a received permission message. Moreover, the TPF can be configured through a series of flows to dynamically update the permission rules whenever there is a new permission message available, log errors, exceptions, and/or un-subscribed messages, and alert or communicate information to a support team.

Textual and numeric data from a content source are sent to the feed queue on a TPF server. The TPF server may include a number of execution groups. According to an embodiment of the present invention, there are four execution groups in the TPF engine.

The first, ExecutionGroup1, handles all application messages. Once the message type is identified, for instance as textual, numeric, or metadata, the message is routed to the corresponding node in the Process Flow 111, with specific tags determining its fulfillment criteria (e.g., information regarding how the data should be packaged and delivered). If there are any errors in the XML tag structure, the messages are sent to the error queue and no further processing is done. If the particular item is subscribed to by any partner 107, individual messages are created for each partner with the subscribed elements in a corresponding XML message. Once all the fulfillment details are identified and mapped, the individual messages for those partners are sent to a queue or distribution list based on these criteria.

The second, ExecutionGroup2, is directed to analytics data processing. Analytics data may arrive via drive mapping as a CSV file, for example. These files are sent to a feed queue and the message flow picks up those messages. Message definitions and sets in the flow are converted into an XML message for the partners. Due to the large amount of data, multiple flows may be used for rapid processing. Several message flow instances are initiated.

The third, ExecutionGroup3, allows purging of the messages on the Partner queues if the messages are not being read. This is a simple execution group containing, for example, purge flows for the various partners 107.

Finally, ExecutionGroup4, controls the permissions, fulfillment, audit tools, and email utilities for exception handling. This execution group contains miscellaneous utilities such as Auditing, Email Alerts, and Fulfillment flows. Permissioning is used to identify partner subscriptions to each data set (News& Pricing, Analytics, etc.). A fulfillment system generates a permission file and sends the file to a permission feed queue. This message is read by the permission flow and data is refreshed in a database instance in the TPF engine. This data is used, for example, by an Exchange Web Services (EWS) flow to map partners to each incoming message item to determine data recipients. An audit tool determines the number of messages processed.

Figure 2:
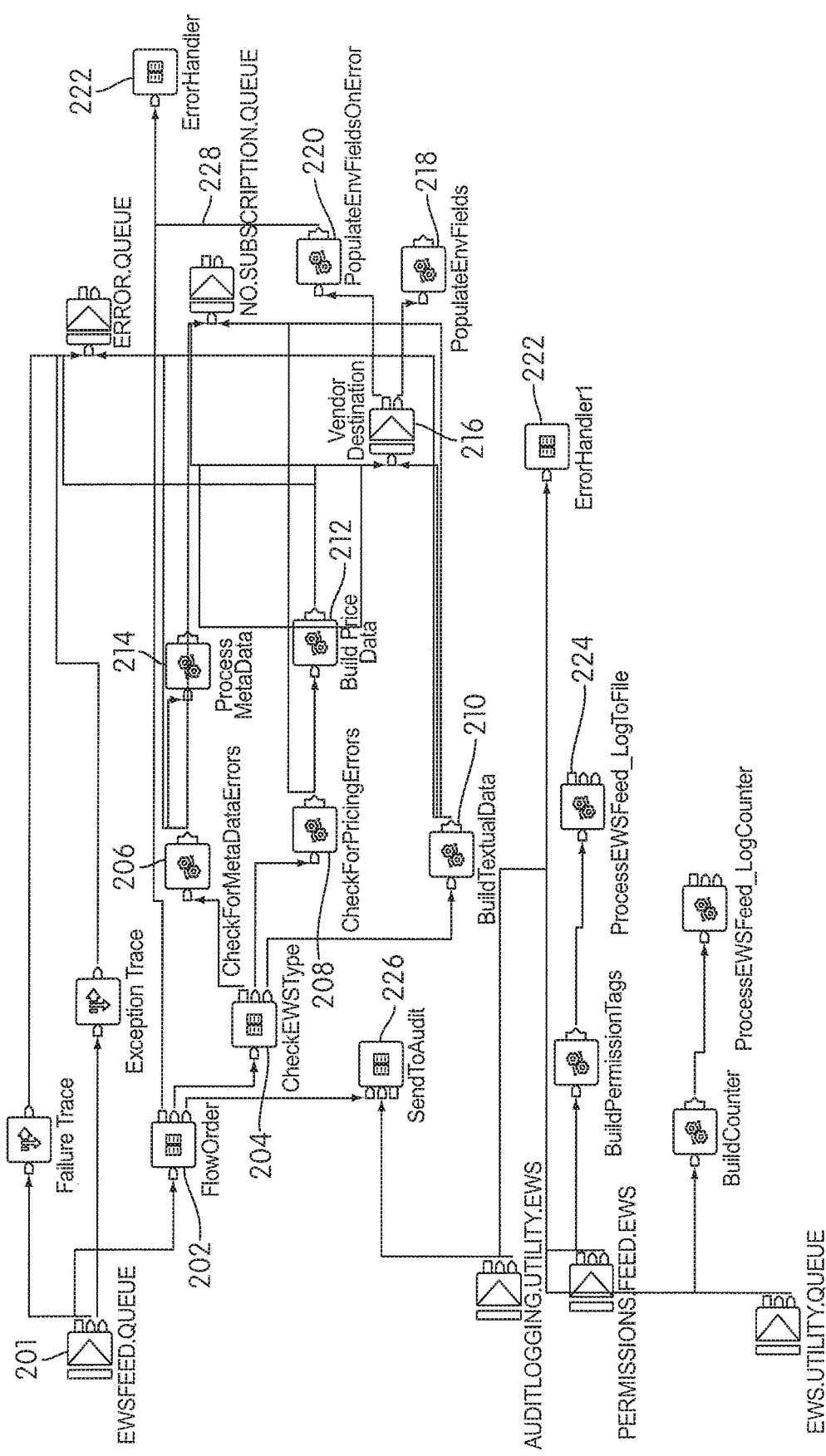
FIG. 2 is a diagram showing the content feed process flow according to an embodiment of the present invention.

More specifically, as shown in FIG. 2, a message arrives into the application feed queue node 201 and is routed to a Flow Order 202 node by the TPF engine. The Flow Order 202 node regulates the message flow and routes the message to a CheckEWSType node 204.

Figure 4:
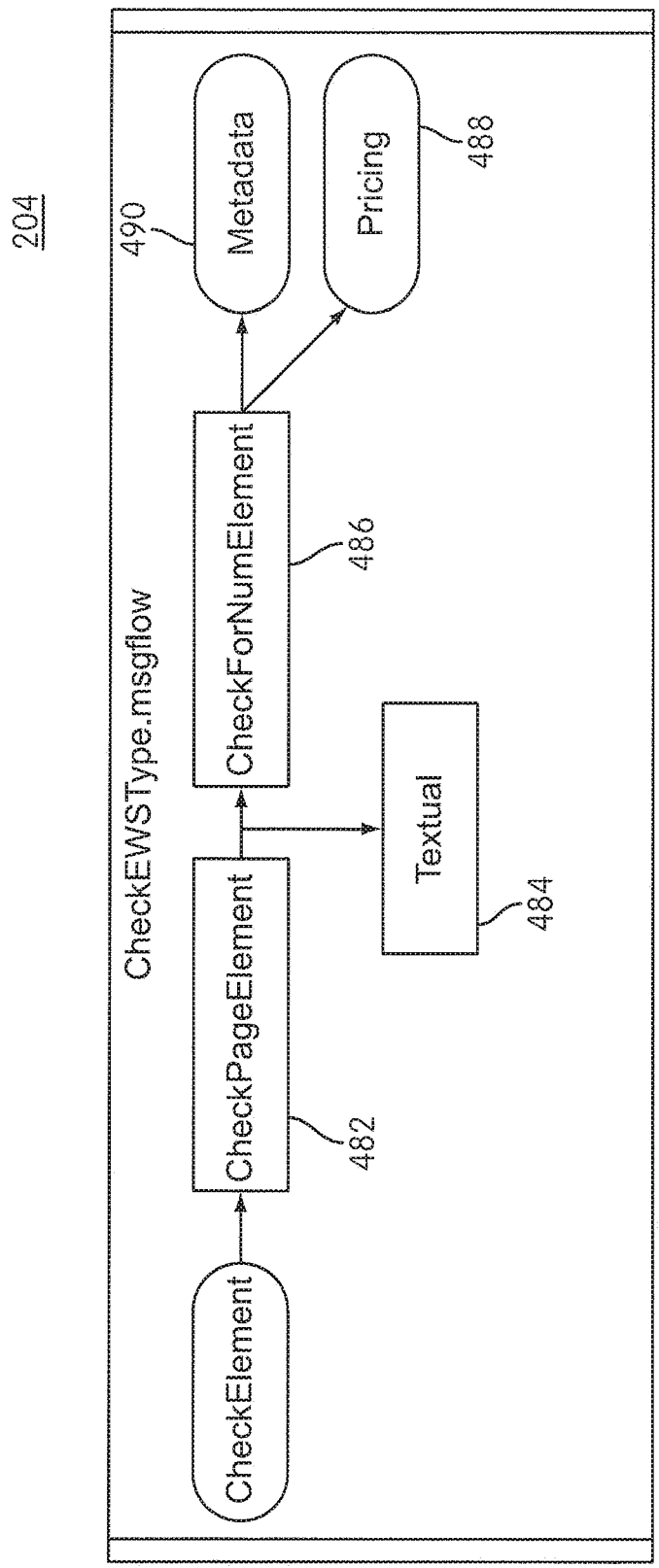
FIG. 4 is a diagram showing the check content type process flow according to an embodiment of the present invention.

As shown in FIG. 4, the check content type node 204 (CheckEWSType) determines the message type and routes the message to the appropriate node for its message type. For example, this message flow determines whether an XML input message is textual, numeric or metadata by checking for the corresponding tag. This is a commonly used flow across all message flows. Textual messages are recognized by the presence of  tag (482) and are routed for textual processing (484), for instance, to the Build Textual Data 210 node shown in FIG. 2. Price messages are recognized by the presence of the <num> tag (486) and are routed and processed according to a numeric flow. For instance, price messages may be checked for pricing errors (488). Similarly, metadata messages may be checked for metadata errors (490).

More specifically, the Check Pricing Errors node 208, shown in FIG. 2, checks the message for errors, missing mandatory information (Symbol, DataPoint, PermCode, DateTime, Date, Trans Attributes), and invalid permission codes. It then processes the price point list to send the valid entries and propagate the message to anode for building the price data.

A Build Price Data node 212 builds the individual messages for each partner based on the permission code and the subscription details in the Permissions table. If there is no vendor subscribing to this category the message is sent to a NOSUBSCRIPTION queue 228. The node transforms the date format and trans code (to New from Resend for the Future price assessments that are resent the next day) and sends the message to the Vendor Destination node 216, which in turn routes it the appropriate partner queue(s) depending on the permission file. The message will be sent to an error queue if there are no price point elements.

The Build Textual Data node 210 validates the tags in the message and builds the individual textual messages for each partner based on the permission code and the subscription details in a Permissions table. If there is no vendor subscribing to this category the message is sent to a NOSUBSCRIPTION queue 228. If there are vendors subscribing to this category, then node 210 transforms the date format, and appends tags such as service type, service code etc. Exemplary tags according to an aspect of the present invention, including path, description, and applicable rules, are provided in Table 3. The node 210 then builds the individual vendor specific message and then propagates it to the Vendor Destination node 216.

A Process MetaData node 214 builds a metadata message, when appropriate, for each partner in a similar fashion to the Build Price Data node and sends the message to the Vendor Destination node 216.

Figure 3:
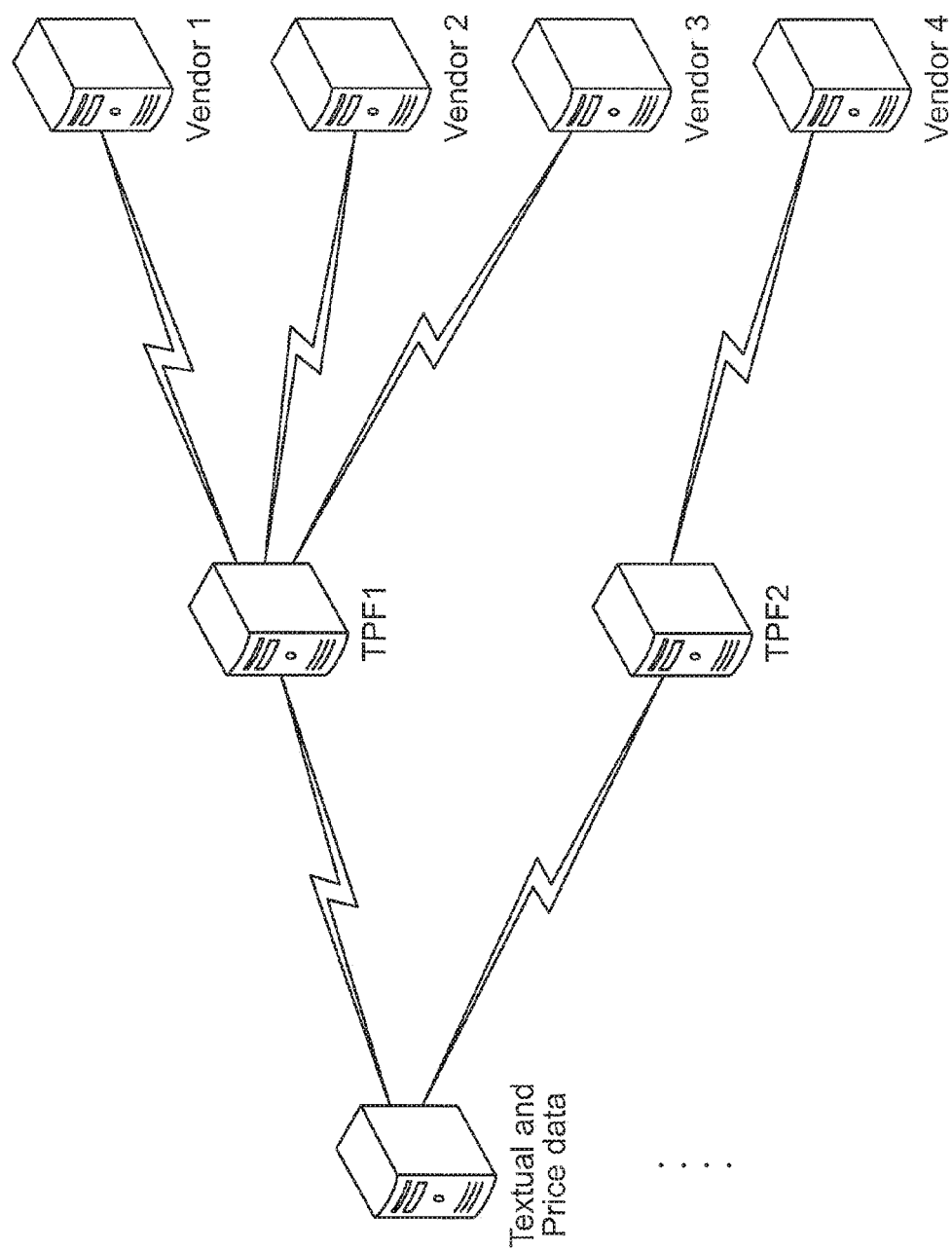
FIG. 3 is a diagram showing an exemplary high-level architecture according to an embodiment of the present invention.

The Vendor Destination node 216 routes the message to the appropriate physical queue. An exemplary high-level architecture according to an embodiment of the present invention, including vendors, is shown in FIG. 3. This high-level architecture shows a textual and price data generation system in communication with at least one TPF, which is in communication with at least one of a plurality of vendors. If a queue exists, and there are no errors or exceptions to prevent or otherwise interfere with delivery, the Vendor Destination node 216 routes the output message to the Populate Env Fields node 218. Otherwise the message is sent to the Populate Env Fields On Error node 220. The Populate Env Fields node 218 prepares the message for auditing. For example, node 218 may set environment variables for auditing purposes. The Populate Env Fields On Error node 220 verifies exceptions and errors to the partner queue and populates the necessary environment fields to send the message to error processing.

Figure 5:
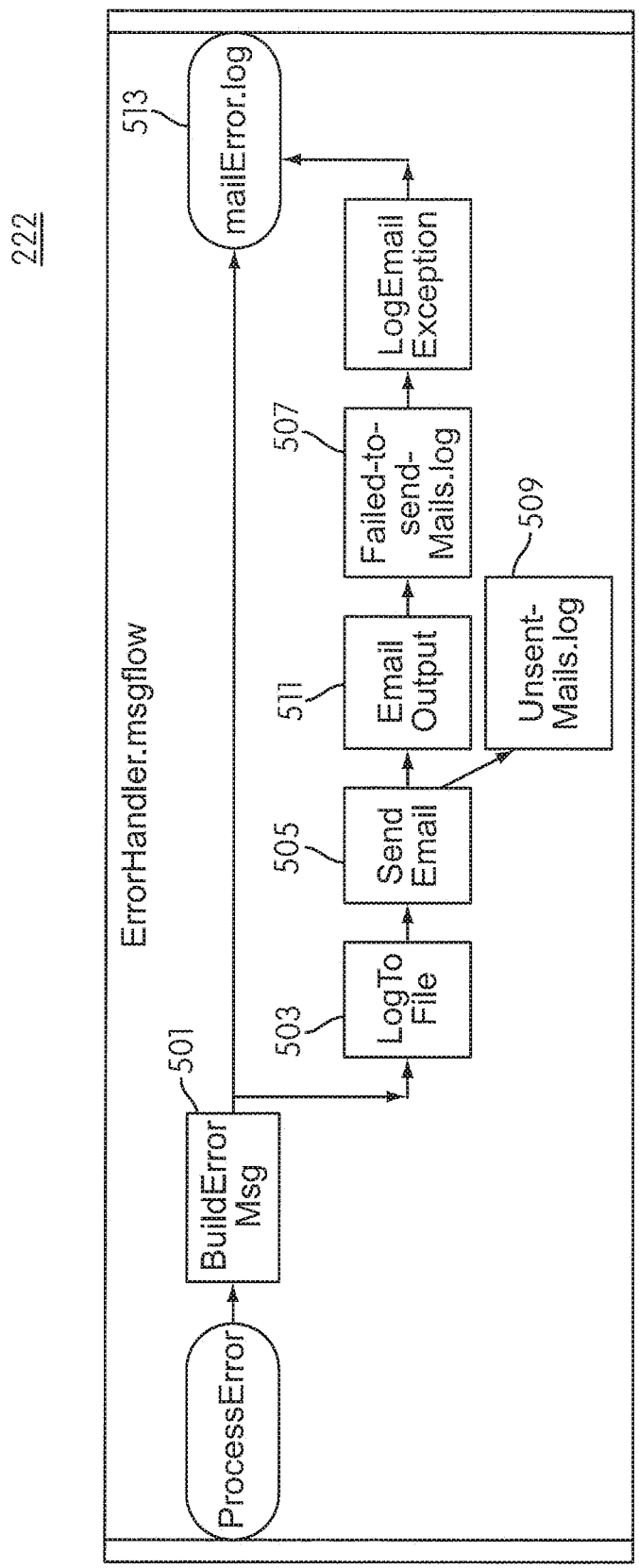
FIG. 5 is a diagram showing the error handler process flow according to an embodiment of the present invention.

As shown in FIG. 5, an error handling node 222 may be used for exception handling and error reporting. For example, this message flow may be configured to receive an error, build an error message, log it to a file for reference, and determine whether to send an email or not based on the log level. According to embodiments of the present invention, this is a flow that can be used across all the message flows. The Build Error Message node 501 forms the error message and logs it. The error message may specify in a text/XML file whether it is an unknown exception or another exception and may specify the timestamp, message id, and the content of the error message. The Log To File node 503 logs the error message and propagates this message to the Send Email node 505. Depending on the error flag, the Send Email node 505 either logs the message to a Failed-to-send-Mails log 507, or unsent email queue 509, or sends it for email output. The Email Output node 511 sends the email to the designated email address via the assigned mail server. Failures and exceptions may be logged, as well as the reason for, or details regarding, any failures in mailerror.log 513.

Figure 6:
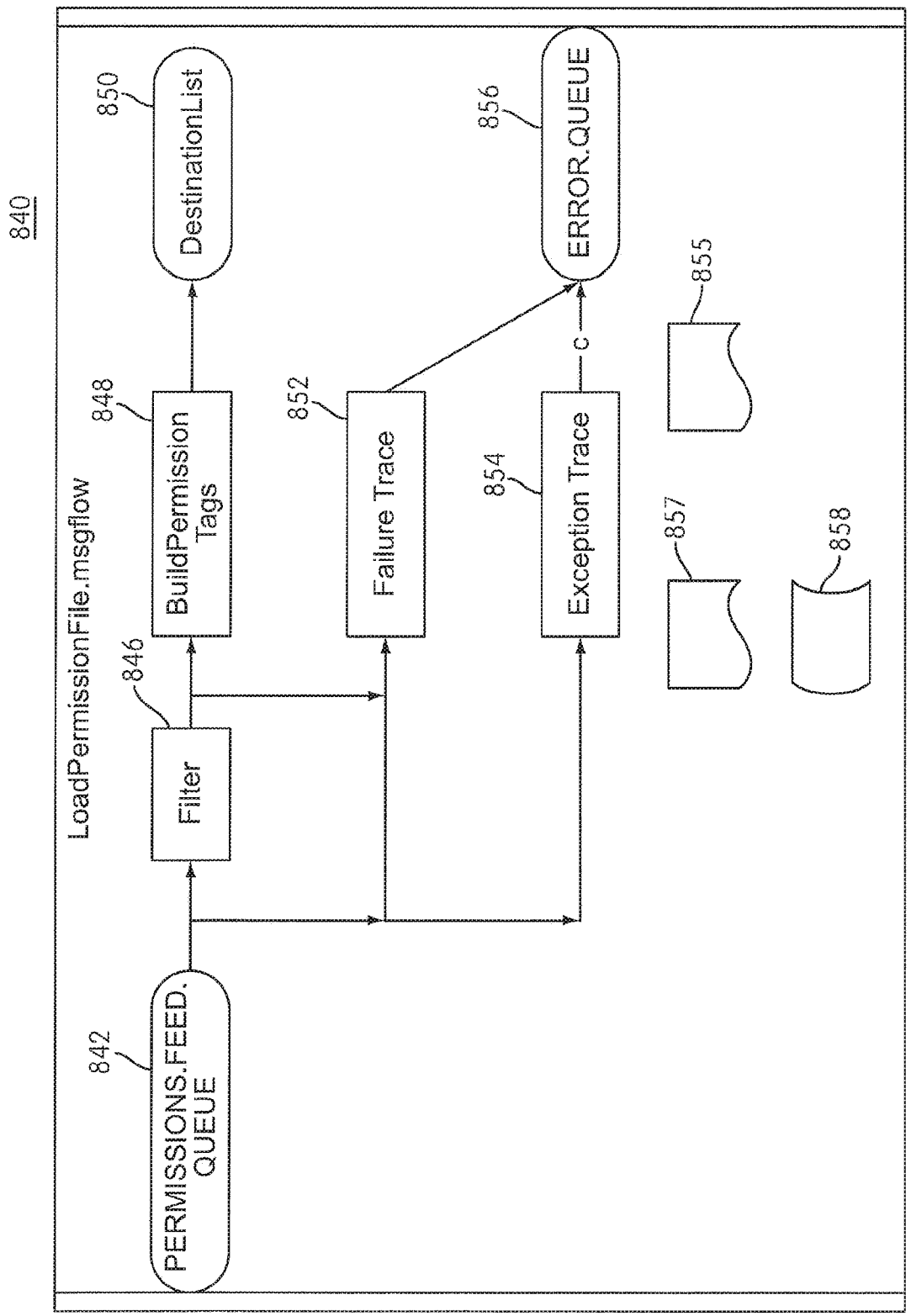
FIG. 6 is a diagram showing the load permission file process flow according to an embodiment of the present invention.

As shown in FIG. 6, a Load Permission File Flow may be used to load the permission codes from a fulfillment system into a permissions database 858. The file received is parsed and the details are uploaded into the database table. The unique design of the TPF rule engine 101 allows real-time application of business rules and business changes. For instance, this message flow architecture allows the system to maintain subscription details in real time by processing the permission file 857, as designed by the fulfillment system. For example, the Load Permission File message flow may process the permission file 857 in real time whenever there is a change in the incoming permission file 857 by processing the details and updating the permission database 858.

Figure 7:
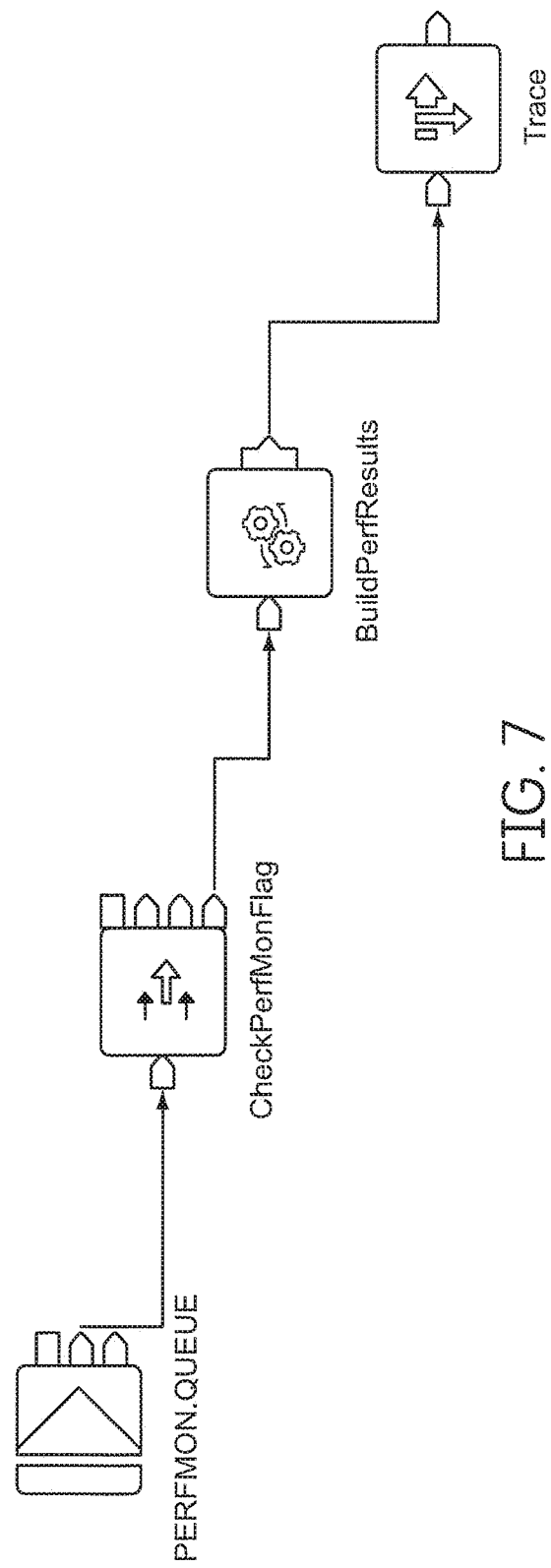
FIG. 7 is a diagram showing the load perfmon results process flow according to an embodiment of the present invention.

As shown in FIG. 7, a Perfmon Results Flow may be used to record performance statistics of the delivery system. Performance statistics may include, for example, time to delivery for a vendor or the difference in delivery times between vendors. The audit flow may include checking for a performance flag or other indication of performance. After the audit flow, each message is sent to a performance monitoring queue. If performance monitoring is turned on, the results are built and logged.

Figure 8:
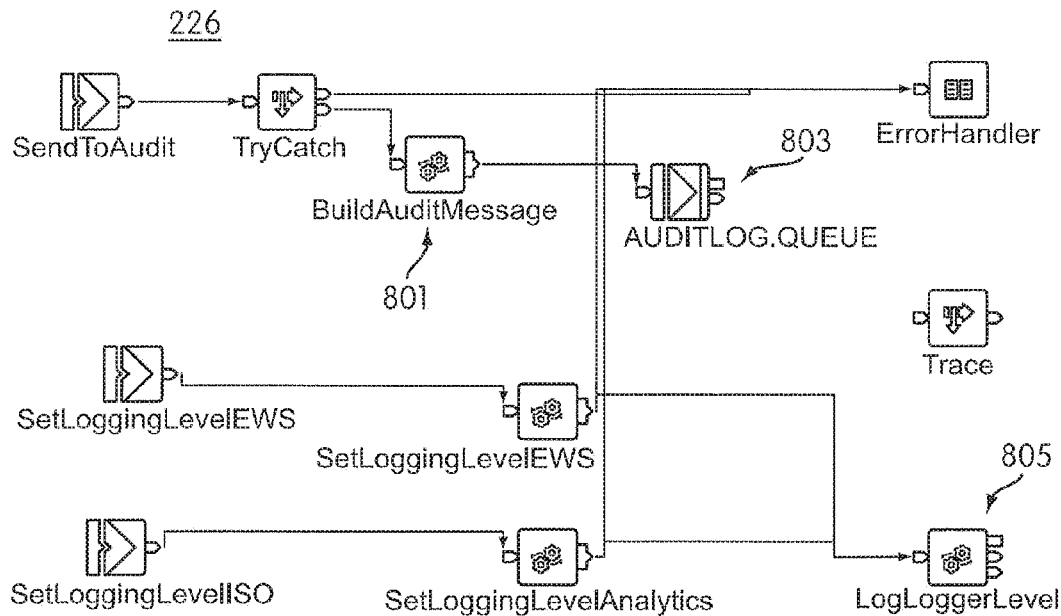
FIG. 8 is a diagram showing the send to audit process flow according to an embodiment of the present invention.

As shown in FIG. 8, a Send to Audit Flow 226 is used to log the audit results. After processing for partner transmission, the message is received by the Build Audit Message node 801, which builds the message needed for audit logging and sends it to the audit log queue 803. Auditing is turned on by sending the XML messages to ISO and application audit logging utilities. This change can be logged in the audit log as well by using the Log Logger Level node 805.

Figure 9:
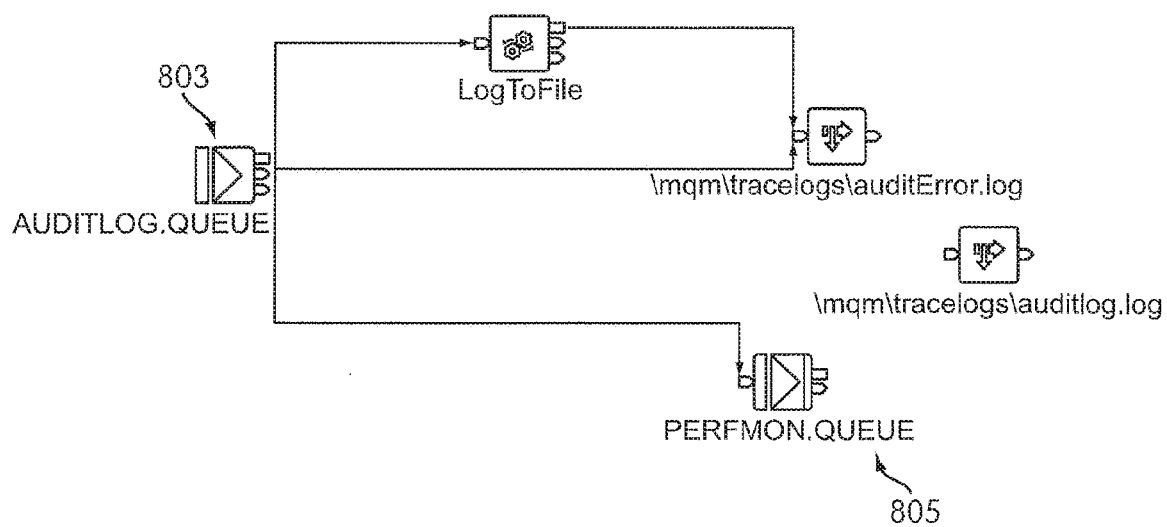
FIG. 9 is a diagram showing the load audit data log process flow according to an embodiment of the present invention.

As shown in FIG. 9, in an audit data log flow, once the message reaches the Audit Log queue 803, it is logged and propagated to the Performance Monitoring queue 805 to record performance details. If there are any errors, an error message can be saved.

Figure 10:
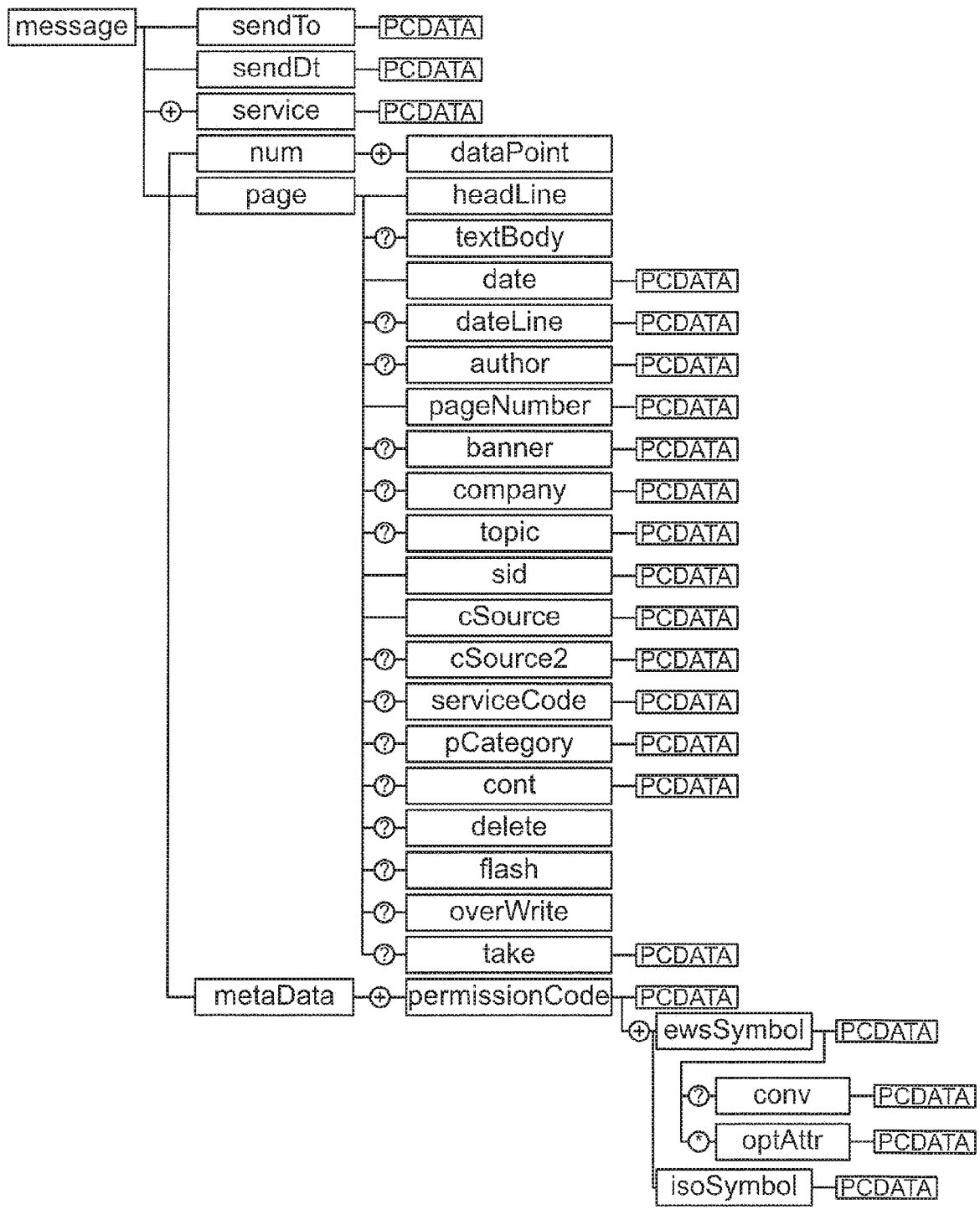
FIG. 10 is a diagram showing the structure of an exemplary XML element hierarchy according to an embodiment of the present invention.

An exemplary Messaging Structure according to an embodiment of the present invention is shown in FIG. 10. According to an embodiment of the present invention, the system uses the custom, simplified XML tag set shown in FIG. 10 to deliver real-time textual and numeric content directly to a plurality of subscribers. This XML tag set specifies all of the information needed to package, process, and distribute real time content messages and includes an advanced tagging structure that allows granular content customization and flexibility.

In this example, the root element of the XML data is the <message> tag. This contains four of six possible child elements: the first, second and third tags—<sendTo>, <sendDt> and <service>—are required in all messages. The fourth tag is either <num> OR  OR <metaData>. All real-time messages take one of the following forms:

Numeric Message Form

```
<message>
    <sendTo> ...</sendTo>
    <sendDt> ... </sendDt>
    <service> ... </service>
    <num> ... </num>
</message>
```

Page Message Form

```
<message>
    <sendTo> ...</sendTo>
    <sendDt> ... </sendDt>
    <service> ... </service>
     ... 
</message>
```

Metadata Message Form

```
<message>
    <sendTo> ... </sendTo>
    <sendDt> ... </sendDt>
    <service> ... </service>
    <metaData> ... </metaData>
</message>
```

Figure 11:
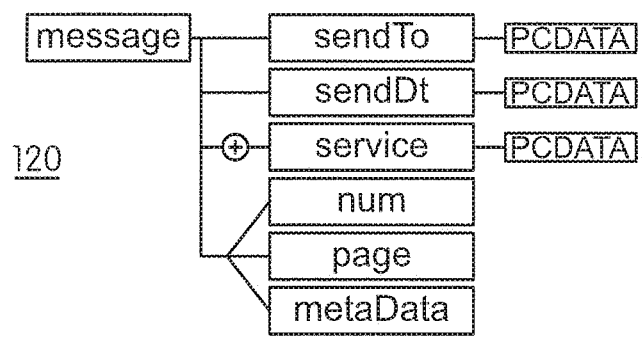
FIG. 11 is an XML Simple Tag Element Hierarchy Diagram in accordance with an embodiment of the present invention.

An XML Tag Element Hierarchy diagram 120 that includes the <message> tag and its children is independently shown in FIG. 11. FIG. 11 shows only those tags that are common to all messages, according to an embodiment of the present invention.

Figure 12:
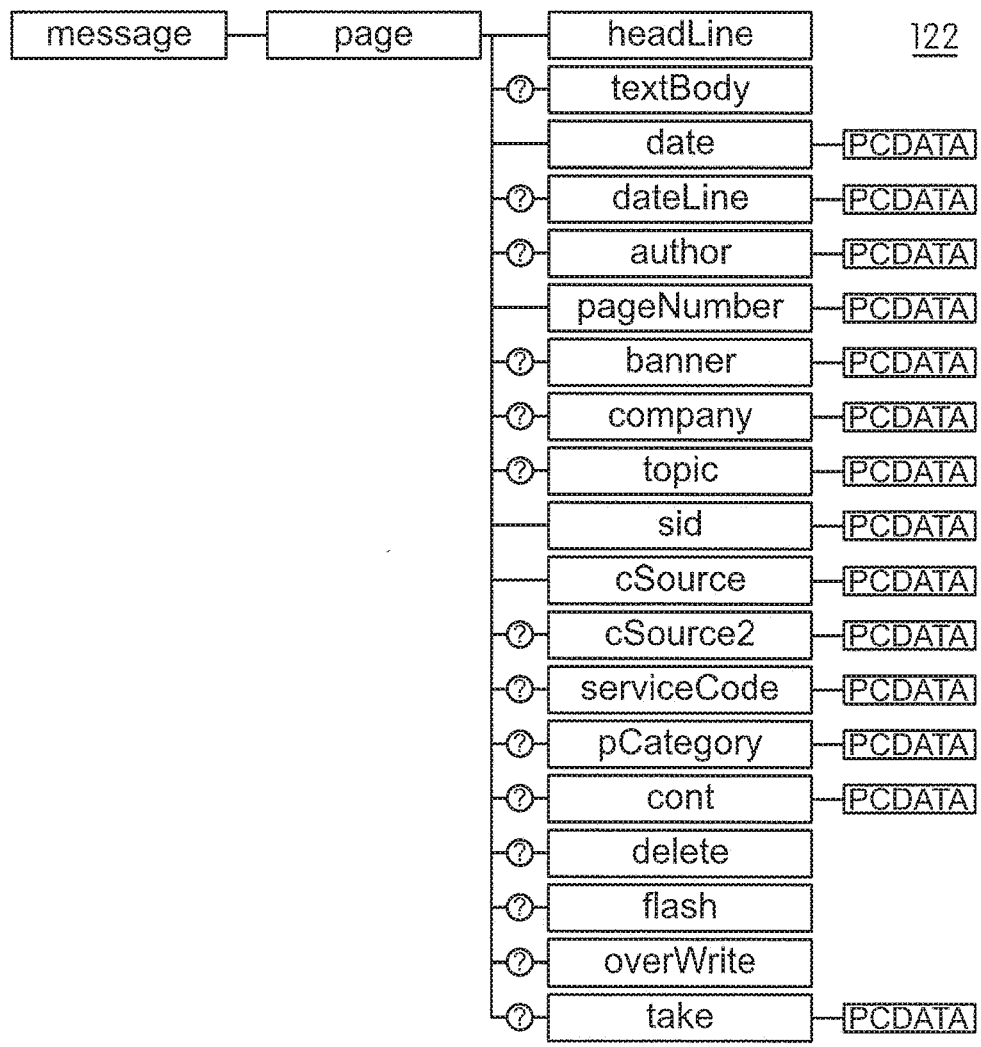
FIG. 12 is an XML Textual Element Hierarchy Diagram in accordance with an embodiment of the present invention.

In FIG. 12 is an XML Tag Element Hierarchy Diagram 122 illustrating the parent-child relationship of the XML  tag used for textual news stories. The  tag is not used for numeric or formatted data.

Figure 13:
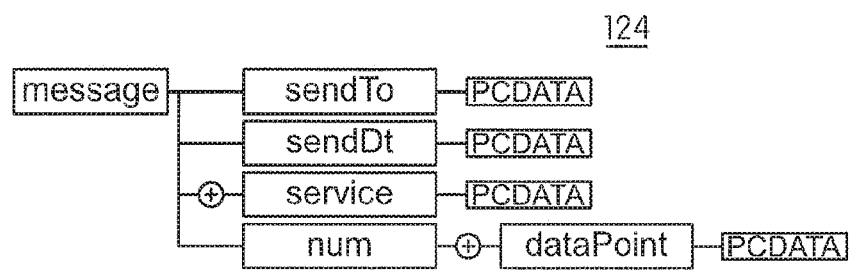
FIG. 13 is an XML Numeric Element Hierarchy Diagram in accordance with an embodiment of the present invention.

In FIG. 13 is an XML Tag Element Hierarchy Diagram 124 illustrating the parent-child relationship of the XML <num> tag used for both News & Pricing and Analytics data through both the <num> and <dataPoint> tags. These messages are similar, except that the Analytics data may include additional attributes.

Figure 14:
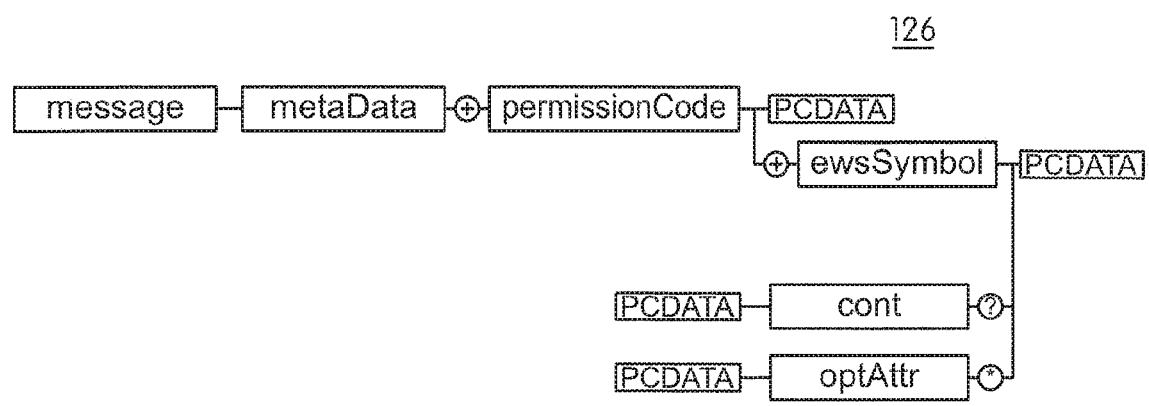
FIG. 14 is an XML Metadata Element Hierarchy Diagram in accordance with an embodiment of the present invention.

In FIG. 14 is an XML Tag Element Hierarchy Diagram 126 illustrating the parent-child relationship of the XML <metadata> tag used for news and pricing metadata.

Business Rules

Textual business rules support the distribution of news, market commentary, transactions, and proprietary assessment and fundamentals tables pertinent to each defined market. These rules may be directed to determining message date and time characteristics, distributing a periodic "Heartbeat" page, setting standard textual page characteristics, including required and optional tags for Textual Pages, assigning unique page identification tags, implementing processing rules such as transmission or storage rules, implementing display rules, providing delete/overwrite instructions, and/or topic and company codes.

Table 1 includes a listing of exemplary business rules that may be applied by the TPF rule engine for processing textual messages associated with a data feed, such as a real-time XML feed in accordance with the present invention.

TABLE 1

Textual Business Rules

| Rule ID | Message Type | Short Description | Rule(s) |
|---|---|---|---|
| BRP101 | Text | Message date and time characteristics | Unless otherwise stated, use <sendDt> as the master timestamp to store textual message content. |
| BRP102 | Text | XML DD "heartbeat" page | System distributes a "heartbeat" page every three (3) minutes using the values <cSource> = "PGA" and <pageNumber> = "0242" to verify connectivity. The heartbeat should never be displayed on the user screen. |
| BRP103 | Text | Standard textual page characteristics | BRP103.1 <message>  identifies the message as a textual page. BRP103.2 Maximum page width = 80 columns BRP103.3 Maximum headline width = 120 columns BRP103.4 Page length is determined by the content; it does not exceed twelve (12) kb (approximately 320 rows). |
| BRP104 | Text | Required tags for Textual Pages | All textual Page transmissions must contain the following tags: <message>, <sendTo>, <sendDt>, <service>, , <headLine>, <date>, <pageNumber>, <sid>, and <cSource>. |
| BRP105 | Text | Optional tags for Textual Page | Textual Page transmissions can contain any of the following tags: <textBody>, <dateLine>, <author>, <banner>, <company>, <topic>, <cSource2>, <serviceCode>, <pCategory>, <cont>, <delete>, <flash>, <flashFollow>, <overWrite>, and <take>. |
| BRP106 | Text | Unique Page Identification | BRP106.1 Each page is uniquely identified by the combination of the <cSource>, <pageNumber> and <sid> tags. BRP106.2 Pages are identified by concatenating the <cSource> and <pageNumber> tags for storage and recall purposes. The <sid> tag differentiates versions of each page BRP106.3 A sequential <sid> value is assigned to every textual page transmission, independent of the underlying textual content. The <sid> values repeat after 999,999 page transmissions. This happens approximately monthly. BRP106.4 If a published page needs to be corrected or deleted pursuant to BRPL14 or 15 below, XML DD will do so within a few days of the original page transmission to ensure the correct <sid>, <cSource>, <pageNumber> combination can be found. |
| BRP107 | Text | How to process pages that include the <cSource2> tag | BRP107.1 If a page transmission includes the <cSource2> tag, then replicate the content for each service identified. This is in addition to the normal processing of the <cSource> value. BRP107.2 Each value in the <cSource2> tag should be combined with the <pageNumber> and <sid> tags to form the additional unique pages. BRP107.3 Each unique combination should be stored independently for recall by the user. BRP107.4 (Subscribers only): Apply user permissions identified in the <cSource> or <cSource2> tags to each unique page as further defined in BRPL16. |
| BRP108 | Text | XML DD Newswire pages | BRPLOS.1 Newswires often exceed the maximum file size and/or page height allowed by most systems. Therefore, XML DD breaks individual Newswiretransmissions into multiple smaller pages. BRPLOS.2 XML DD embeds codes in the <topic> tag in each individual page transmission. These tags contain instructions for building the newswire from the individual pages. This allows end- |

TABLE 1-continued

Textual Business Rules

| Rule ID | Message Type | Short Description | Rule(s) |
|---|---|---|---|
| | | | users to view an entire newswire as a single story at the user interface. BRPL 08.3 To view a newswire as a single story, systems should process the <topic> tag codes as follows:<br>　Topic codes are in the following format:<br>　　o P###S#O#<br>　　O "P" stands for "Page"<br>　　O "###" represents the starting page number of the sequence<br>　　O "S#O#"; S#=the current page's sequence number "O=of" and the second "#"=the total number of pages in the group.<br>Append each sequential page ("S#") in a series, as defined by unique <cSource> to the previous sequential page with the same topic code (but with a different sequence number).<br>To identify the final Newswire sequence, concatenate the <cSource> and <pageNumber> values from the first page in the series pursuant to BRP106. |
| BRP109 | Text | How to display a textual Story on a terminal or client application | BRP109.1 A textual Story must display the <headLine> followed by the <textBody> and then the <banner>.<br>BRP109.2 The <banner> tag defines the service name. It is center-aligned at the bottom immediately after <textBody> |
| BRPL10 | Text | How to display a textual Story containing continuation pages on a terminal or client application | BRPL10.1 XML DD distributes textual pages in multiple messages, using a <cont> tag to identify the follow-on or continuation page. The value in the <cont> tag corresponds to the 1-4 digit page number of the next page. Please note: the 1-4 digit page number is not always the same as the <pageNumber> tag value. It may also include a <cSource> reference.<br>BRPL10.2 The <cSource> or <cSource2> value of the originating page should always be the same as the continuation page.<br>BRPL10.3 Each page in a continuation series can also contain a <take> tag that identifies the sequence number of the associated page and the starting page number of the sequence separated by a space.<br>BRPL10.4 The <take> and <cont> tags are displayed in the footer of the associated story page along with the <banner> tag. The <take> is aligned to the far left of the footer, <banner> is in the middle and <cont> is to the far right.<br>Note: Some applications allow the user to navigate to the next page by clicking the <take> or <cont> values within the footer. |
| BRPL11 | Text | How to identify and process a Newsflash textual message | BRPL11.1 Messages with a NULL- valued <flash> tag are News Flashes. News Flashes are urgent headlines sent while XML DD editors develop the full story.<br>BRPL11.2 XML DD follows mostNews Flash pages with a "Flash- Follow" page within five (5) to sixty (60) minutes of the News Flash transmission.<br>BRPL11.3 The Flash Follow ALWAYS contains the same<sid>, <cSource>/<cSource2>, and <pageNumber> values as the original News Flash.<br>BRPL11.4 A Flash Follow usually contains the same <headLine> value as the News Flash. However, XML DD may distribute a News Flash without a "Flash-Follow". |

TABLE 1-continued

Textual Business Rules

| Rule ID | Message Type | Short Description | Rule(s) |
| --- | --- | --- | --- |
| BRPL12 | Text | How to identify and store a Flash-Follow textual message | BRPL12.1 Any message with aNULL-valued <flashFollow> tag is a Flash Follow. A Flash Follow is an update to a News Flash. BRPL12.2 Since a Flash Follow is an update to a News Flash, XML DD requires subscribers to append the <textBody> of the Flash Follow to theoriginal stored News Flash. BRPL12.3 A Flash Follow contains the same <sid>, <cSource> and/or <cSource2>, and <pageNumber> values as the original News Flash. BRPL12.4 The <textBody> of the original News Flash message (if one was sent) with matching <sid>, <cSource> and/or <cSource2> and <pageNumber> values should be replaced with the <textBody> of the Flash Follow message and remain stored relative to the <sendDt> of the original News Flashmessage. BRPL12.5 In addition toBRPL12.3, the Flash Follow message should also be stored as an independent new message relative to the <sendDt> value of the Flash Follow message. |
| BRPL13 | Text | How to display of a News Flash Headline | BRPL13.1 Subscriber platforms MUST differentiate News Flash headlines from normal headlines. Note: This can be achieved in numerous ways. For example by using different text font/color for News Flashes, using "Alert"-style pop-up windows, etc. BRPL13.2 XML DD requires subscriber platforms to insert the word "NEWSFLASH: " in front of the value for the <headLine> tag of a News Flash. |
| BRPL14 | Text | How to identify and process a Delete Story Instruction (DSI) message | BRPL14.1 A DSI message is an instruction to delete a previously sent textual message and includes a NULL-valued <delete /> tag. BRPL14.2 Upon receipt of a DSI message, search for a previous textualmessage with matching <cSource> I <cSource2>, <pageNumber> and <sid> values and delete the original message completely. BRPL14.3 An explanation of the reason for the deletion may be contained in the <textBody> tag of the DSI message. BRPL14.4 A DSI can only occur within 24 hours following distribution of the original textual message. |
| BRPL15 | Text | How to identify and process an Overwrite Story Instruction (OSI) | BRPL15.1 An OSI message is an instruction to overwrite apreviously sent textual message and includes a NULL-valued <overWrite /> tag. BRPL15.2 Upon receipt of an OSI message, search for a previous textual message with matching <cSource> I <cSource2>, <pageNumber> and <sid> values and overwrite the original message with the new OSI message. BRPL15.3 An OSI can occur up to seven (7) days after the original story transmission. BRPL15.4 An explanation of the reason for the OSI message may be contained in the <textBody> of the OSI. |

TABLE 1-continued

Textual Business Rules

| Rule ID | Message Type | Short Description | Rule(s) |
|---|---|---|---|
| BRPL16 | Text | How to permission textual content (Subscribers only) | XML DD affixes tags that can be used to filter and/or provision content to end-users.<br>BRPL16.1 Most Legacy subscriber platforms filter content for provisioning XML DD services using the <cSource>/ <cSource2> tags.<br>Only messages containing aproduct or service value matching an individual user's permissions, as provided by XML DD, should be accessible by the user.<br>BRPL16.2 XML DD introduced the new <serviceCode> tag to replace the use of <cSource> and <cSource2> for provisioning XML DD services. The <serviceCode> tag contains one or more pre-defined XML DD service codes corresponding to the target product or service. Only messages containing a product or service value matching an individual user's permissions, as provided by XML DD, should be accessible by theuser.<br>BRPL16.3 XML DD is introducing a <permissionCode> tag for future provisioning of XML DD services. This will segregate each service into smaller groups of pages that can be bundled to build a product or service using one or more <permissionCode> values. This will require subscribers to maintain mappings ofindividual <permissionCode> values that comprise a product or service and filter messages to the end user accordingly. |
| BRPL17 | Text | Topic codes | BRPL17.1 XML DD uses the <topic> tag to distribute topic codes<br>BRPL17.2 Topic codes indicate that the content belongs to specific categories such as geographical regions, and/or general subjects or markets. Users typically use Topic codes to filter the content at the user interface. |
| BRPL18 | Text | Specialty Topic Codes | If<topic> = "XXX" the listening service or platform should omit the story from any scrolling headline stack(s) at the user interface level only. |
| BRPL19 | Text | Company Codes | The <company> tag is used to disseminate codes within textual messages corresponding to a specific company or other entity. This code is typically used to filter textual content. |
| BRPL27 | Text | News page Corrections | BRPL20.1 A Correction message is an instruction to overwrite a previously sent textual message and includes a NULL-valued <correct> tag.<br>BRPL20.2 Upon receipt of a Correction message, search for a previous textual message with matching <cSource> I <cSource2>, <pageNumber> and <sid> values and overwrite the original message with the new Correction message.<br>BRPL20.3 A Correction can occur up to seven (7) days after the original story transmission.<br>BRPL20.4 An explanation of the reason for the Correction message may be contained in the <textBody> of the Correction<br>BRPL20.5 When a Correction isreceived, it should be displayed relative to the <sendDate> value of the latest Correction. Any reference to the original message should be removed. |

Similar to the Textual Business rules, Numeric Business rules support the distribution of News & Pricing data as well as Analytics data. These rules may be related to, for example, identifying a numeric price message, process and storing date references for numeric updates, identifying message transaction type, identifying and processing a deletion, determining permission for numeric content, identifying price value confidence, and/or differentiating data delivery timing.

Table 2 includes exemplary business rules that may be applied by the TPF rule engine for processing numeric messages associated with a data feed, such as a real-time XML feed in accordance with the present invention. Some of the rules may apply to all numeric message types, while others may be more applicable to only news and pricing or analytics data.

TABLE 2

Numeric Business Rules

| Rule ID | Message Type | Short Description | Rule(s) |
|---|---|---|---|
| BRPL20 | News & Pricing; Analytics | How to identify a numeric price message | Numeric transmissions must contain the followingtags: <message>, <sendTo>, <sendDt>, <service>, <num> and <dataPoint> |
| BRPL21 | News & Pricing; Analytics | How to process and store date references for numeric updates | BRPL21.1 The <sendDt> tag provides the date and time that XML DD distributed the update. BRPL21.2 The dateTime attribute of the <dataPoint> tag provides the date and time to update the associated time series database. |
| BRPL22 | News & Pricing | How to identify the message transaction type | All numeric messages include a trans attribute defining the "transaction" type. |

| | | trans value | Description |
|---|---|---|---|
| | | C | Correction |
| | | N | New Update |
| | | D | Delete |
| | | R | Resend |

| Rule ID | Message Type | Short Description | Rule(s) |
|---|---|---|---|
| BRPL23 | News & Pricing | How to identify and process a deletion | A <dataPoint> value = "−999999" that includes a trans attribute with a value = "D" (delete) means the associated instrument update, including the date, should be deleted from the database. |
| BRPL24 | News & Pricing | How to permission numeric content (Subscribers only) | XML DD includes several attributesthat can be used to filter and/or provision numeric content to end- users. BRPL24.1 Each numeric message contains a perm Code attribute, containing a data category. This attribute is used to bundle groups of instruments into price data packages. Proper processing and storage of this field is required. XML DD can provide detailed package definitions upon request. |
| BRPL25 | Analytics | How to identify the price value confidence | Currently, most ISOs report only preliminary and settlement prices. Preliminary prices are reported first. One ISO -PIM - also reports 'ADVISORY' prices, which are followed by 'PRELIMINARY' and then 'SETTLEMENT' prices. In the future, more ISOs are likelyto adopt 'ADVISORY' prices. For example, Every hour, a price for asubset of PODs is reported. These are considered "ADVISORY" prices. At the start of each business day, PJM releases "PRELIMINARY" prices for the previous day. Any record that had an ADVISORY price reported gets updated with the PRELIMINARY price. If therewas no ADVISORY for a POD, a new record is created. Most, but not all, PODs have Preliminary prices. On the fourth or fifth business day of the month, "SETTLEMENT" prices are released for the previous month.Any record having an ADVISORY or PRELIMINARY price will be updated with the SETTLEMENT price. If therewas no ADVISORY or PRELIMINARY price for a POD, a new record is created.Not all PODs have settlementprices. |
| BRPL26 | News & Pricing or Analytics | How to differentiate data delivery timing for a specific user | XML DD maintains data delivery business models based on the timingof delivery to an end-user, e.g. XML DD Market Data uses multiple "cut-times" to deliver different regional data categories, whereas the same data is distributed in real-time via this XML datafeed. To differentiate |

TABLE 2-continued

Numeric Business Rules

| Rule ID | Message Type | Short Description | Rule(s) |
|---|---|---|---|
| | | | business models, XML DD introduced the "type" and "releaseTime" children to the <service> tag. The "type" value corresponds to the business model, while the "releaseTime" value corresponds to the time that the data may be released to users of the corresponding service "type". Consumers that wish to consolidate receipt of XML DD content on the XML feed and support/offer multiple XML DD business modelsmust do the following: Maintain user information that contains the user's service "type", e.g. real-time versus XML DD Market Data Match data delivery timing to service type as defined by XML DD |

Message Distribution Process

Once the message for a subscriber (vendor, partner) is built, the message is delivered over a public or private network to the appropriate destination. After an acknowledgement is received from the destination, the next message is delivered. If there is a network disruption and the acknowledgment is not received, the message transfer is rolled back and then delivered when the connectivity is back up.

According to an aspect of the distribution process of the present invention, each message can be delivered in real-time, globally, to any desired destination. For instance, messages from a content generator can be dynamically transformed, packaged, processed, and distributed all in real-time (e.g., as they are received), rather than being stored, and then retrieved at a later time for distribution to a particular subscriber. Further, the system allows setting a priority level to each message so that a better performance can be achieved by transferring the high priority messages first. In certain embodiments, messages are queued up at the source until a successful transmission is made, which ensures that no data is lost when the destination system is not available. Moreover, the messaging system allows reliability and audit-ability of the data sent because each message can have its own message ID and a correlation ID, which allows unique message transfer and associated statistical data, for instance, data regarding when the message was delivered.

According to an aspect of the present invention, a custom and simple Document Type Definition (DTD) for the XML system is used. Each XML tag specified within the DTD for the XML Element Hierarchy, illustrated in FIG. 10, may be divided into subsections representing major DTD categories, such as: Message tags (common to all messages); Numeric tags (News & Pricing data); Numeric tags (Analytics data); Textual tags; and Metadata tags (News & Pricing and Analytics). The Element Hierarchy Diagram (FIG. 10) is used to illustrate exemplary parent-child relationship of complex types.

Table 3 provides tag names, the paths, as well as a description for each tag, including applicable rules. It also contains content data type, sample values (if appropriate), frequency of tag occurrence, its attributes, and sub-elements, if any. If the tag does not have any attributes or sub-elements, then those sections are excluded from the listing. The DTD Source is used only for complex tag types.

TABLE 3

| Path | Tag Name | Description |
|---|---|---|
| Root element. | <message> | This is the root element of an XML message. It indicates the start and end of a message, |
| <message> | <sendDt> | Tag indicating the date and time that of message distribution. The value from this tag should be used as the <dataPoint> dateTime attribute for storing numeric News & Pricing messages. |
| <message> | <sendTo> <service> | Tag indicating partner distribution. Parent tag providing service "type" and release timing instruction related to underlying message. The "type" attribute identifies the specific delivery type, e.g. real-time versus end-of-day, while "releaseTime" provides the date and time that the message may be released to end-users. This is for Partners only. |
| <message> <num> | <dataPoint> | Contains the data point value and descriptive attributes. Required for <num> message types. It represents the price at a given point in time. Identifies the message as numeric data (versus textual content). Used to update a time-series database of the referenced instrument (<symbol>). |

TABLE 3-continued

| Path | Tag Name | Description |
|---|---|---|
| <message>  | <author> | Specifies the name of the provider of the page content. |
| <message>  | <banner> | The name of the service the message is associated with. Part of the display in a properly formed page. |
| <message>  | <company> | A tag containing one or more codes representing specific entities or companies referenced in a page. Provides mechanism for filtering articles by company at the user interface. |
| <message>  | <cont> | The <take> and <cont> tags may be used together to distribute associated textual stories as a series of linked pages. The <cont> tag identifies a "continuation" page. Its page number reference uses the same <cSource> or <cSource2> value as the originating page. |
| <message>  | <cSource> | Contains the 3-letter service code that in combination with the <pageNumber> tag identifies a unique page of content. It is used for permissioning textual content. |
| <message>  | <cSource2> | Contains the 3-letter service code that in combination with the <pageNumber> tag identifies a unique page of content. Used only when multiple service codes are assigned to the underlying textual page transmission. It processes the associated page and store two (2) copies; one associated with <cSource> and one associated with <cSource2>. Each copy is treated as unique content for permissions and privileging purposes |
| <message>  | <date> | Indicates the date and time a textual page is published. YYYY-MM-DDThh:mm:ss.sTZD hh = two digits of hour (00 through 23) (am/pm NOT allowed) mm = two digits of minute (00 through 59) ss = two digits of second (00 through 59) s = one or more digits representing a decimal fraction of a second TZD = time zone designator (Z or or +hh:mm or −hh:mm) |
| <message>  | <dateLine> | The geographic location where the story originated. |
| <message>  | <delete> | Indicates the page content is to be deleted. Deletes any previous instance of a page transmitted with the same <sid>, <cSource> and <pageNumber> values during a 24 hour period. |
| <message>  | <flash> | Identifies textual page content as a "News Flash". News Flashes are used to communicate late breaking news or market events while the story is being developed. They typically do not contain a <textBody> tag. The system may (but is not required to) transmit the full story details (known as a "Flash Follow"), which. includes the <textBody> tag within one (1) hour of the News Flash message using the same story identification tag values. |
| <message>  | <headLine> | Required. Contains text used to form the headline for a News Story, Flash or Flash Follow. |
| <message> <report>  | <overWrite> | Tag instructing overwriting of a previously distributed page. Overwrite any previous instance of a page transmitted with the same <sid>, <cSource> / <cSource2> and <pageNumber> values during a 24 hour period. |
| <message> |  | Tag used for textual news stories. Identifies the start and end of the textual data for all news stories. It is not used for numeric market data or formatted data. |

TABLE 3-continued

| Path | Tag Name | Description |
|---|---|---|
| <message><page> | <pageNumber> | Tag used with <cSource> to define a specific textual page. These two tags are typically used to search for or recall pages of content at the user interface. Combining <cSource>, <pageNumber> and <sid> tags provides a mechanism for storing any version of a specific page. |
| <message><page> | <pCategory> | Optional tag defining the category of page type that the underlying page belongs to. |
| <message><page> | <serviceCode> | Tag listing service or services to which the underlying textual message belongs. Used for textual content privileging and permissions purposes by the system and Partners. |
| <message><page> | <sid> | Story Identifier. A unique seven-digit number assigned to every textual page transmission. This tag is critical for version control. |
| <message><page> | <take> | The <take> and <cont> tags may be used in tandem to distribute a series of associated textual stories. The <take> tag contains the page sequence number within the series, followed by the page number that starts the series. |
| <message><page> | <textBody> | Tag used to encapsulate the body text of any given textual page, e.g. contains the actual story. Although most updates include this tag, it is optional and applies solely to textual messages. |
| <message><page> | <topic> | Tag that associates textual content with desired subject, category or group, e.g. specific geographical region and/or general subject or market. Used to filter content by desired "topic". |
| <message><metaData><permissionCode><ewsSymbol> | <conv> | Optional tag containing information for converting price values from one unit of measure to another) based on commodity-specific characteristics such as specific gravity. |
| <message><metaData><permissionCode> | <ewsSymbol> | Tag containing one symbol that is part of the parent permission code. Each permission code can have many ewsSymbol tags. |
| <message> | <metaData> | Container for News & Pricing metadata. |
| <message><metaData><permissionCode><ewsSymbol> | <optAttr> | Optional tag containing descriptive attributes related to <ewsSymbol> such as commodity, location, delivery period, etc. |
| <message><metaData> | <permissionCode> | Two or three digit code that groups the News & Pricing symbols together for permissioning Provisions and filters numeric messages by data category. |
| <message><metaData><permissionCode> | isoSymbol | The unique identifier that represents a point of delivery and frequency type. |
| <message> | <metaData> | Container for Analytics metadata. |
| <message><metadata> | <permissionCode> | This tag is for internal processing purposes. It is represented as a 2 or 3digit code that groups the Analytics and News & Pricing symbols. It is used to determine what content the customer will receive. |

In accordance with another aspect of the invention, at least two types of messages (textual and numeric) can be received. The following are examples of transforming an input document, the process for tag mapping each type of message, and generated output documents.

Example 1—Textual

An exemplary input document, for example, from the textual data queue, which can be processed in accordance with the present invention, is shown below:

```
<?xml version="1.0" encoding="UTF-8"?>
<!DOCTYPE MESSAGE[
<!-- this document is not valid -->
]>
<MESSAGE>
<SEND_DT>20100611 01:03:54</SEND_DT>
<REPORT>
 <PRIORITY> 1</PRIORITY>
 <SOURCE>
  <EW>
    <SERVER>sgcplew</SERVER>
    <DBREPLICA>852566ad0056a9ec</DBREPLICA>
    <UNID>186263C390C06BF88525773F001BCC1F</UNID>
```

-continued

```
</EW>
</SOURCE>
<DESTINATION VENDOR="BLOOMBERG" FORMAT="PLATTS">
  <IDENTIFIER>01</IDENTIFIER>
  <FEEDBANNER>--Platts Global Alert--</FEEDBANNER>
</DESTINATION>
<DESTINATION VENDOR="COMSTOCK" FORMAT=
"COMSTOCK">
  <FEEDBANNER>--Platts Global Alert--</FEEDBANNER>
  <FEEDTOPIC>ML,OPC,QA,PET,N,QQ,PET,PROD,
PLTN</FEEDTOPIC>
</DESTINATION>
<DESTINATION VENDOR="TELERATE" FORMAT="PLATTS">
  <IDENTIFIER>01</IDENTIFIER>
  <FEEDBANNER>--Platts Global Alert--</FEEDBANNER>
  <FEEDTOPIC />
</DESTINATION>
<DESTINATION VENDOR="EMIS" FORMAT="EMIS">
  <FEEDBANNER>--Platts Global Alert--</FEEDBANNER>
</DESTINATION>
<DESTINATION VENDOR="KR" FORMAT="PLATTS">
  <IDENTIFIER>01</IDENTIFIER>
  <FEEDBANNER>--Platts Global Alert--</FEEDBANNER>
</DESTINATION>
<DESTINATION VENDOR="NTM" FORMAT="NTM">
  <IDENTIFIER>PL</IDENTIFIER>
  <FEEDTOPIC>MEAST OPEC QA CRU PLTN CRU PROD
PLTN</FEEDTOPIC>
</DESTINATION>
<DESTINATION VENDOR="PCN" FORMAT="PLATTS">
  <COMSTOCKEXCHANGE />
  <FEEDBANNER>--Platts Global Alert--</FEEDBANNER>
  <NOPAGENUMBER/>
  <PRODUCT>PCN</PRODUCT>
  <FEEDTOPIC>MEAST OPEC QA CRU N ENY PGA CRU PROD
PLTN</FEEDTOPIC>
</DESTINATION>
<PAGE>
  <HEADLINE> 109--Tender data: Tasweeq offers 4.8 mil barrels Aug
Al-Shaheen crude</HEADLINE>
    <TEXT_BODY>Singapore (Platts)--11Jun2010/103 am EDT/503
GMT
Seller: Tasweeq
Country: Qatar
Specs & quantity: Eight cargoes of heavy sour Al-Shaheen crude,
      each 600,000 barrels
Port: FSO Astro Canopus
When: Loading Aug 1-2, Aug 3-4, Aug 7-8, Aug 9-10, Aug 16-17,
  Aug 21-22, Aug 22-23, 25-26
Basis: Differential to front line Platts Dubai assessment
Close: June 14, with validity until June 17
Data from: Trade source
Notes: Tasweeq last sold nine parcels of Al-Shaheen crude, each 600,000
barrels, loading in July at discounts of about $1.00-1.20/barrel to Platts
Dubai assessments. Buyers were said to be majors ExxonMobil, Japan's
Nippon Oil and Thailand's PTT.
--Wendy Cheong, wendy_cheong@platts.com</TEXT_BODY>
  <DATE>20100611 01:03:54</DATE>
  <DATELINE>Singapore</DATELINE>
  <AUTHOR>wcheo</AUTHOR>
  <PAGEHEADER>MHO 109</PAGEHEADER>
  <BANNER>--Platts Global Alert--</BANNER>
  <PAGEWIDTH>78</PAGEWIDTH>
  <PAGEHEIGHT>120</PAGEHEIGHT>
  <TOPIC>MEAST OPEC QA CRUN ENY PGA CRU PROD
PLTN</TOPIC>
```

```
  <SID>7649836</SID>
  <CSOURCE>PGA</CSOURCE>
  <CSOURCE2>PPN</CSOURCE2>
  <MRIC>PGA109</MRIC>
  <NATTRIB>PLATTS</NATTRIB>
  <NPRODUCT>PGA PGT</NPRODUCT>
  <NSTYLE>3</NSTYLE>
  <PCATEGORY>NW</PCATEGORY>
  </PAGE>
</REPORT>
</MESSAGE>
```

Upon receipt of a textual input message, such as the message above, by the message flow, the following processing may be performed:

First, the message is propagated to a "Check Content Type" node, which, for example, may run the CheckEW-SType message flow shown in FIG. 4. In this example, the message would be identified as "Textual" message based on the presence of the "PAGE" tag.

The message is then routed to a "Build Textual Data" node, such as node 210 shown in FIG. 2. This node may verify that the message includes valid tags, check for any missing tags, and route the message to an error queue if there is a missing tag. If there are valid tags, a second check is then performed to verify the vendors who subscribe to this category of message. Each vendor has the permissions set up against the <cSource> tag. If there are no vendors who subscribe to the <cSource> tag in the incoming message, the message is sent to a no-subscription queue. If there are subscribing vendors, then individual messages are created from one input message to each individual vendor with a separate <sendTo> tag.

All the incoming tags are not necessarily translated. However, the following tags may be picked up from the input message, and new tags may be added, such as the <serviceType> tag, which has been included to expand the data delivery options to more types of data in future using the same delivery mechanism:

```
<headLine>
<textBody>
<date>
<dateline>
<author>
<banner>
<topic>
<sid>
<pCategory>
```

After the message is built for each vendor, the message is propagated to a Vendor Destination node, such as node 216 in FIG. 3. From the Vendor Destination node the message is finally sent to the specific queue created for the vendor in the system. After completing the delivery, the message is sent to a second flow where the audit details are captured to report on performance and auditing information.

An exemplary output document could be as follows:

```
<message>
    <sendTo>BACKUP</sendTo>
    <sendDt>2010-06-11 TO 1:03:54-04:00</sendDt>
    <service type="RealTime" releaseTime="2010-06-11 T01 :03:54-04:00"/>

<headLine> 109--Tender data: Tasweeq offers 4.8 mil barrels Aug Al-
        Shaheen crude</headLine>
        <textBody>Singapore (Platts)--11Jun2010/103 am EDT/503 GMT Seller:
        Tasweeq
        Country: Qatar
```

-continued

```
        Specs & quantity: Eight cargoes of heavy sour Al-Shaheen crude,
        each 600,000 barrels
        Port: FSO Astra Canopus
        When: Loading Aug 1-2, Aug 3-4, Aug 7-8, Aug 9-10, Aug 16-17, Aug
        21-22,
            Aug 22-23, 25-26
        Basis: Differential to front line Platts Dubai assessment
        Close: June 14, with validity until June 17
        Data from: Trade source
        Notes: Tasweeq last sold nine parcels of Al-Shaheen crude, each 600,000
        barrels, loading in July at discounts of about $1.00-1.20/barrel to Platts
        Dubai assessments. Buyers were said to be majors ExxonMobil,
        Japan's Nippon
        Oil and Thailand's PTT.
        --Wendy Cheong, wendy_cheong@platts.com</textBody>
        <date>2010-06-11T01:03:54-04:00</date>
        <dateLine>Singapore</dateLine>
        <author>wcheo</author>
        <pageNumber>0109</pageNumber>
        <banner>--Platts Global Alert</banner>
        <topic>ML,OPC,QA,PET,N,QQ,PET,PROD,PLTN</topic>
        <sid>7649836</sid>
        <cSource>PGA</cSource>
        <cSource2>PPN</cSource2>
        <serviceCode>PPN</serviceCode>
        <pCategory>NW</pCategory>

</message>
```

Example 2—Numeric

An exemplary input document, for example, from the numeric data queue, which can be processed in accordance with the present invention, is shown below:

Input Document:

```
<?xml version="1.0" encoding="UTF-8"?>
<!DOCTYPE MESSAGE[<!-- this document is not valid -->]>
<MESSAGE>
 <SEND_DT>20100611 01:46:35</SEND_DT>
 <REPORT>
  <PRIORITY>2</PRIORITY>
  <SOURCE>
   <EW>
      <SERVER>NYWPLSA</SERVER>
      <DBREPLICA>85256738005038EC</DBREPLICA>
      <UNID>05C4D52536CD3BD838525773F001FBB12</UNID>
   </EW>
  </SOURCE>
  <DESTINATION VENDOR="COMSTOCK" FORMAT="COMSTOCK"/>
  <DESTINATION VENDOR="EMIS" FORMAT="EMIS"/>
  <DESTINATION VENDOR="KR" FORMAT="PLATTS"/>
  <DESTINATION VENDOR="BLOOMBERG" FORMAT="PLATTS"/>
  <DESTINATION VENDOR="TELERATE" FORMAT="PLATTS"/>
  <DESTINATION VENDOR="MARKETLINK" FORMAT="MARKETLINK"/>
  <NUM>
   <PRICEPOINT>
      <DATETIME>20100611 00:00:00</DATETIME>
      <BATE>u</BATE>
      <PRICE>690</PRICE>
      <SYMBOL VENDORLIST="COMSTOCK, KR, BLOOMBERG">PDB03Dc 19bCBDAA00DW2</SYMBOL>
      <SYMBOL VENDORLIST="MARKETLINK">CBDAA00 860</SYMBOL>
      <xmlFeedOnly>
      <xmlVendor>COMSTOCK, KR,BLOOMBERG, MARKETLINK </xmlVendor>
      <dataPoint symbol="CBDAA00" cSymbol="PDB03Dc 19bCBDAA00DW2" rSymbol="CBDAA00 860" permissionCode="BA" dateTime="2010-06-11 T00:00:00" bate="u" trans="N">
690.00
</dataPoint>
      <dtTzinfo TZ="EST" />
      </xmlFeedOnly>
```

-continued

Input Document:

```
</PRICEPOINT>
<PRICEPOINT>
    <DATETIME>20100611 00:00:00</DATETIME>
    <BATE>u</BATE>
    <PRICE>690</PRICE>
    <SYMBOL VENDORLIST="COMSTOCK, KR, BLOOMBERG">PDB03Dc 19bCBDAB00DW2</SYMBOL>
    <SYMBOL VENDORLIST="MARKETLINK">CBDAB00 860</SYMBOL>
    <xmlFeedOnly>
    <xmlVendor>COMSTOCK, KR,BLOOMBERG, MARKETLINK </xmlVendor>
    <dataPoint symbol="CBDAB00" cSymbol="PDB03Dc 19bCBDAB00DW2" rSymbol="CBDAB00 860" permissionCode="BA" dateTime="2010-06-1 1T00:00:00" bate="u" trans="N">
690.00
</dataPoint>
    <dtTzlnfo TZ="EST" />
    </xmlFeedOnly>
</PRICEPOINT>
<PRICEPOINT>
    <DATETIME>20100611 00:00:00</DATETIME>
    <BATE>u</BATE>
    <PRICE>705</PRICE>
    <SYMBOL VENDORLIST="COMSTOCK, KR, BLOOMBERG">PDB03Dc 19bCBGAK00DW2</SYMBOL>
    <SYMBOL VENDORLIST="MARKETLINK">CBGAK00 860</SYMBOL>
    <xmlFeedOnly>
    <xmlVendor>COMSTOCK, KR, BLOOMBERG, MARKETLINK </xmlVendor>
    <dataPoint symbol="CBGAK00" cSymbol="PDB03Dc 19bCBGAK00DW2" rSymbol="CBGAK00 860" permissionCode="BA" dateTime="2010-06-1 1T00:00:00" bate="u" trans="N">
705.00
</dataPoint>
    <dtTzlnfo TZ="EST" />
    </xmlFeedOnly>
</PRICEPOINT>
<PRICEPOINT>
    <DATETIME>20100611 00:00:00</DATETIME>
    <BATE>u</BATE>
    <PRICE>705</PRICE>
    <SYMBOL VENDORLIST="COMSTOCK, KR, BLOOMBERG">PDB03Dc 19bCBGA100DW2</SYMBOL>
    <SYMBOL VENDORLIST="MARKETLINK">CBGA100 860</SYMBOL>
    <xmlFeedOnly>
     <xmlVendor>COMSTOCK, KR, BLOOMBERG, MARKETLINK </xmlVendor>
    <dataPoint symbol="CBGA100" cSymbol="PDB03Dc 19bCBGA100DW2" rSymbol="CBGA100 860" permissionCode="BA" dateTime="2010-06-11 T00:00:00" bate="u" trans="N">
705.00
</dataPoint>
    <dtTzlnfo TZ="EST" />
    </xmlFeedOnly>
</PRICEPOINT>
<PRICEPOINT>
    <DATETIME>20100611 00:00:00</DATETIME>
    <BATE>u</BATE>
    <PRICE>569</PRICE>
    <SYMBOL VENDORLIST="COMSTOCK, KR, BLOOMBERG">PDB03Dc 19bCB3BA00DW2</SYMBOL>
    <SYMBOL VENDORLIST="MARKETLINK">CB3BA00 860</SYMBOL>
    <xmlFeedOnly>
    <xmlVendor>COMSTOCK, KR,BLOOMBERG, MARKETLINK</xmlVendor>
    <dataPoint symbol="CB3BA00" cSymbol="PDB03Dc 19bCB3BA00DW2" rSymbol="CB3BA00 860" permissionCode="BA" dateTime="2010-06-11 T00:00:00" bate="u" trans="N">
569.00
</dataPoint>
    <dtTzlnfo TZ="EST" />
    </xmlFeedOnly>
</PRICEPOINT>
<PRICEPOINT>
    <DATETIME>20100611 00:00:00</DATETIME>
    <BATE>u</BATE>
```

-continued

| Input Document: |
|---|

```
        <PRICE>569</PRICE>
        <SYMBOL VENDORLIST="COMSTOCK, KR, BLOOMBERG">PDB03Dc
19bCB3BB00DW2</SYMBOL>
        <SYMBOL VENDORLIST="MARKETLINK">CB3BB00 860</SYMBOL>
        <xmlFeedOnly>
        <xmlVendor>COMSTOCK, KR,BLOOMBERG,
MARKETLINK </xmlVendor>
        <dataPoint symbol="CB3BB00" cSymbol="PDB03Dc 19bCB3BB00DW2"
rSymbol="CB3BB00 860" permissionCode="BA" dateTime="2010-06-11 T00:00:00"bate="u"
trans="N">
569.00
</dataPoint>
        <dtTzlnfo TZ="EST" />
        </xmlFeedOnly>
    </PRICEPOINT>
    <PRICEPOINT>
        <DATETIME>20100611 00:00:00</DATETIME>
        <BATE>u</BATE>
        <PRICE>516</PRICE>
        <SYMBOL VENDORLIST="COMSTOCK, KR, BLOOMBERG">PDB03Dc
19bCB8BA00DW2</SYMBOL>
        <SYMBOL VENDORLIST="MARKETLINK">CB8BA00 860</SYMBOL>
        <xmlFeedOnly>
        <xmlVendor>COMSTOCK, KR, BLOOMBERG,
MARKETLINK </xmlVendor>
        <dataPoint symbol="CB8BA00" cSymbol="PDB03Dc 19bCB8BA00DW2"
rSymbol="CB8BA00 860" permissionCode="BA" dateTime="2010-06-11 T00:00:00"
bate="u" trans="N">
516.00
</dataPoint>
        <dtTzlnfo TZ="EST" />
        </xmlFeedOnly>
    </PRICEPOINT>
    <PRICEPOINT>
        <DATETIME>20100611 00:00:00</DATETIME>
        <BATE>u</BATE>
        <PRICE>516</PRICE>
        <SYMBOL VENDORLIST="COMSTOCK, KR, BLOOMBERG">PDB03Dc
19bCB8BB00DW2</SYMBOL>
        <SYMBOL VENDORLIST="MARKETLINK">CB8BB00 860</SYMBOL>
        <xmlFeedOnly>
        <xmlVendor>COMSTOCK, KR, BLOOMBERG,
MARKETLINK </xmlVendor>
        <dataPoint symbol="CB8BB00" cSymbol="PDB03Dc 19bCB8BB00DW2"
rSymbol="CB8BB00 860" permissionCode="BA" dateTime="2010-06-11 T00:00:00"
bate="u" trans="N">
516.00
</dataPoint>
        <dtTzlnfo TZ="EST" />
        </xmlFeedOnly>
    </PRICEPOINT>
    <PRICEPOINT>
        <DATETIME>20100611 00:00:00</DATETIME>
        <BATE>u</BATE>
        <PRICE>480</PRICE>
        <SYMBOL VENDORLIST="COMSTOCK, KR, BLOOMBERG">PDB03Dc
19bCB1AK00DW2</SYMBOL>
        <SYMBOL VENDORLIST="MARKETLINK">CB 1 AK00 860</SYMBOL>
        <xmlFeedOnly>
        <xmlVendor>COMSTOCK, KR, BLOOMBERG,
MARKETLINK </xmlVendor>
        <dataPoint symbol="CB1AK00" cSymbol="PDB03Dc 19bCB1AK00DW2"
rSymbol="CB1AK00 860" permissionCode="BA" dateTime="2010-06-11 T00:00:00"
bate="u" trans="N">
480.00
</dataPoint>
        <dtTzinfo TZ="EST"/>
        </xmlFeedOnly>
    </PRICEPOINT>
    <PRICEPOINT>
        <DATETIME>20100611 00:00:00</DATETIME>
        <BATE>u</BATE>
        <PRICE>480</PRICE>
        <SYMBOL VENDORLIST="COMSTOCK, KR, BLOOMBERG">PDB03Dc
```

-continued

Input Document:

```
19bCB1A100DW2</SYMBOL>
    <SYMBOL VENDORLIST="MARKETLINK">CB 1 A100 860</SYMBOL>
    <xmlFeedOnly>
    <xmlVendor>COMSTOCK, KR, BLOOMBERG,
MARKETLINK </xmlVendor>
    <dataPoint symbol="CBl A100" cSymbol="PDB03Dc 19bCB1A100DW2" rSymbol="CB
1A100 860" permissionCode="BA" dateTime="2010-06-11 T00:00:00"bate="u" trans="N">
480.00
</dataPoint>
    <dtTzInfo TZ="EST" />
    </xmlFeedOnly>
 </PRICEPOINT>
 <PRICEPOINT>
    <DATETIME>20100611 00:00:00</DATETIME>
    <BATE>u</BATE>
    <PRICE>480</PRICE>
    <SYMBOL VENDORLIST="COMSTOCK, KR, BLOOMBERG">PDB03Dc
19bCB3AJ00DW2</SYMBOL>
    <SYMBOL VENDORLIST="MARKETLINK">CB3AJ00 860</SYMBOL>
    <xmlFeedOnly>
    <xmlVendor>COMSTOCK, KR,BLOOMBERG,
MARKETLINK</xmlVendor>
    <dataPoint symbol="CB3AJ00" cSymbol="PDB03Dc 19bCB3AJ00DW2"
rSymbol="CB3AJ00 860" permissionCode="BA" dateTime="2010-06-1 1T00:00:00"bate="u"
trans="N">
480.00
</dataPoint>
    <dtTzInfo TZ="EST" />
    </xmlFeedOnly>
 </PRICEPOINT>
 <PRICEPOINT>
    <DATETIME>20100611 00:00:00</DATETIME>
    <BATE>u</BATE>
    <PRICE>477</PRICE>
    <SYMBOL VENDORLIST="COMSTOCK, KR, BLOOMBERG">PDB03Dc
19bCB3AK00DW2</SYMBOL>
    <SYMBOL ENDORLIST="MARKETLINK">CB3AK00 860</SYMBOL>
    <xmlFeedOnly>
      <xmlVendor>COMSTOCK, KR, BLOOMBERG,
      MARKETLINK</xmlVendor>
      <dataPoint symbol="CB3AK00" cSymbol="PDB03Dc 19bCB3AK00DW2"
      rSymbol="CB3AK00 860" permissionCode="BA" dateTime="2010-06-
      11T00:00:00" bate="u" trans="N">477.00</dataPoint>
      <dtTzInfo TZ="EST" />
      </xmlFeedOnly>
   </PRICEPOINT>
  </NUM>
 </REPORT>
</MESSAGE>
```

Upon receipt of a numeric input message, such as that above, by the message flow, the following processing is performed:

First, the message is propagated to a "Check Content Type" node, which, for example, may run the CheckEW-SType message flow shown in FIG. 4. In this example, the message would be identified as a "Price1" message based on the presence of the NUM tag.

The message is then routed a "Check Pricing errors" node, such as node 208 of FIG. 2. This node verifies the valid tags and checks for any missing tags and routes it to error queue if there is a missing tag. This node checks the message for errors, missing mandatory information (Symbol, DataPoint, PermCode, DateTime, Date, Trans Attributes), and invalid permission codes. Assuming there are valid tags, a further check is performed to verify the vendors who subscribe to this dispatch category of message. Each vendor has the permissions set up against the permissionCode tag.

If there are no vendors who subscribe to the permission Code tag in the incoming message, the message is sent to a no-subscription queue. If there are subscribing vendors, then individual messages are created from one input message to each individual vendor with a separate <sendTo> tag.

All the incoming tags do not need to be translated; however, the following tags are picked up from the input message: <dataPoint> tag with symbol, dateTime, permCode, bate, and trans attributes. New tags may be added like the <serviceType>, <releaseTime>, and <dispatchReleaseTime>, which have been included to expand the data delivery options to more types of data in the future using the same delivery mechanism.

After the message is built for each vendor, the message is propagated to a Vendor Destination node, such as node 216 of FIG. 2. From the Vendor Destination node the message is finally sent to the specific queue created for the vendor in the system.

After completing the delivery, the message is sent to a second flow where the audit details are captured to report on performance and auditing information.

Output Document:

```
<message>
    <sendTo>BACKUP</sendTo>
    <sendDt>2010-06-11T01:46:35-04:00</sendDt>
    <service type="RealTime" releaseTime="2010-06-11T0146:35-04:00"/>
    <service type="Dispatch" releaseTime="2010-06-11T08:00:00-04:00"/>
    <num>
        <dataPoint symbol="CBDAA00" permCode="BA" dateTime="2010-06-
        11T00:00:00-04:00" bate="u" trans="N">690.00</dataPoint>
        <dataPoint symbol="CBDAB00" permCode="BA" dateTime="2010-06-
        11T00:00:00-04:00" bate="u" trans="N">690.00</dataPoint>
        <dataPoint symbol="CBGAK00" permCode="BA" dateTime="2010-06-
        11T00:00:00-04:00" bate="u" trans="N">705.00</dataPoint>
        <dataPoint symbol="CBGA100" permCode="BA" dateTime="2010-06-
        11T00:00:00-04:00" bate="u" trans="N">705.00</dataPoint>
        <dataPoint symbol="CB3BA00" permCode="BA" dateTime="2010-06-
        11T00:00:00-04:00" bate="u" trans="N">569.00</dataPoint>
        <dataPoint symbol="CB3BB00" permCode="BA" dateTime="2010-06-
        11T00:00:00-04:00" bate="u" trans="N">569.00</dataPoint>
        <dataPoint symbol="CB8BA00" permCode="BA" dateTime="2010-06-
        11T00:00:00-04:00" bate="u" trans="N">516.00</dataPoint>
        <dataPoint symbol="CB8BB00" permCode="BA" dateTime="2010-06-
        11T00:00:00-04:00" bate="u" trans="N">516.00</dataPoint>
        <dataPoint symbol="CB 1AK00" permCode="BA" dateTime="2010-06-
        11T00:00:00-04:00" bate="u" trans="N">480.00</dataPoint>
        <dataPoint symbol="CB 1 A100" permCode="BA" dateTime="2010-06-
        11T00:00:00-04:00" bate="u" trans="N">480.00</dataPoint>
        <dataPoint symbol="CB3AJ00" permCode="BA" dateTime="2010-06-
        11T00:00:00-04:00" bate="u" trans="N">480.00</dataPoint>
        <dataPoint symbol="CB3AK00" permCode="BA" dateTime="2010-06-
        11T00:00:00-04:00" bate="u" trans="N">477.00</dataPoint>
    </num>
</message>
```

Example 3—Flow Details

Figure 15:
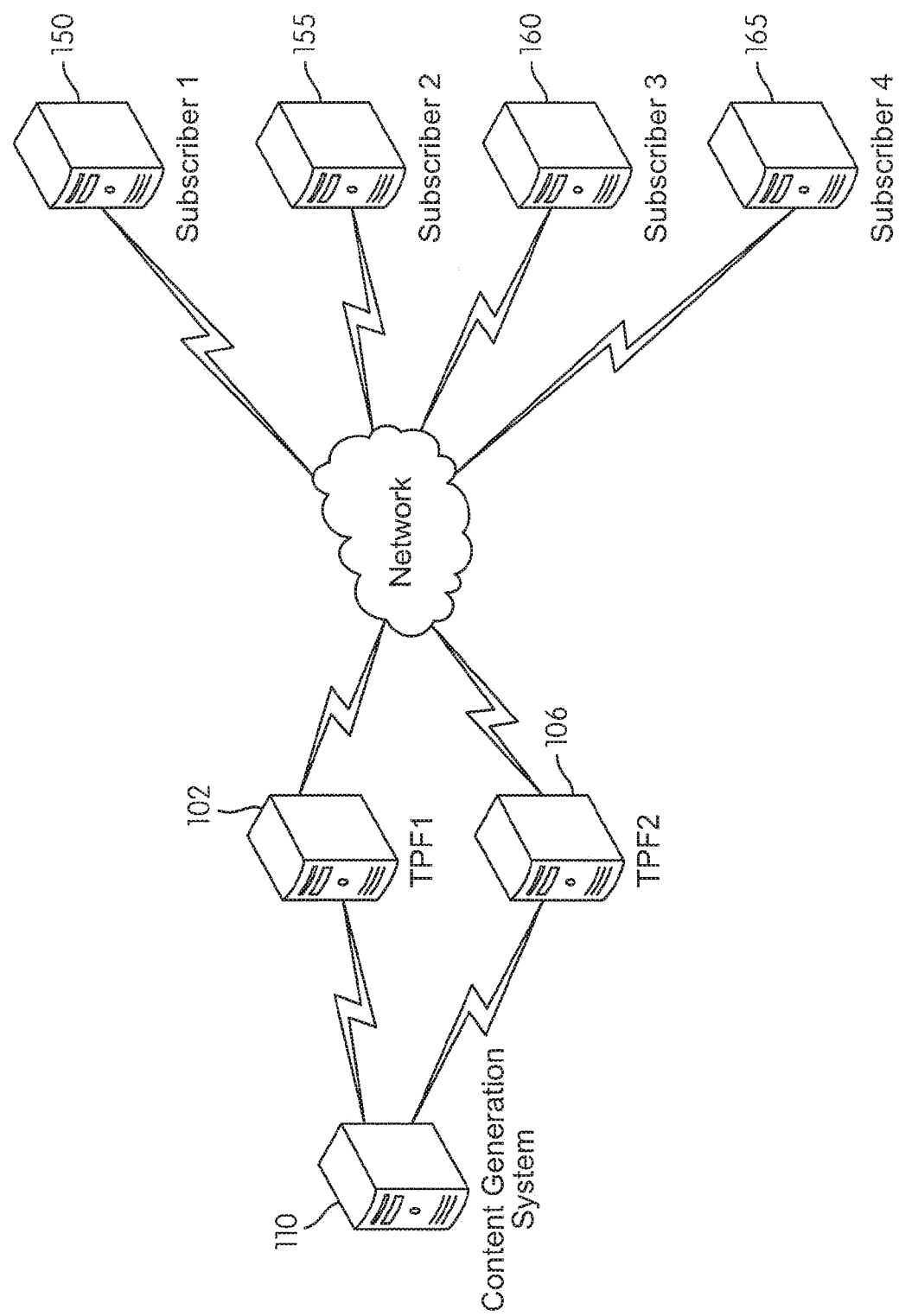
FIG. 15 is a logical network diagram of a generalized content publication system in accordance with an embodiment of the present invention.

Shown in FIG. 15 is a logical network diagram of an exemplary content publication system according to an embodiment of the present invention. Various types of numeric and textual content are received by at least one Transform Publish Filter (TPF) 102, 106 from a Content Generation System 110 via a computer network, such as the internet. The TPFs 102, 106 transform and dynamically package the received data and publish it to at least one of a plurality of subscribers 150,155,160, 165 based on a set of permissioning rules and via a network, such as the internet.

Figure 16:
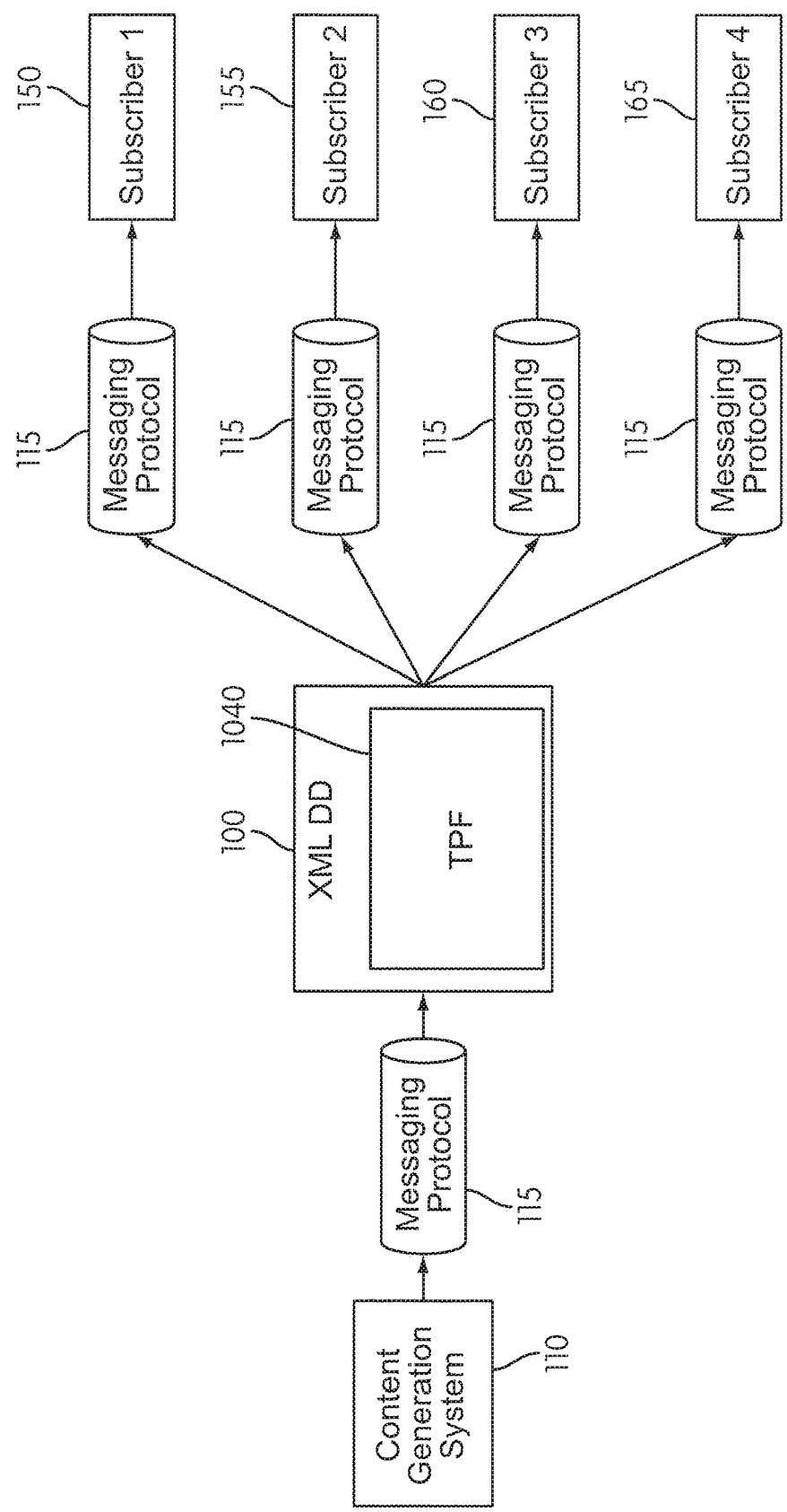
FIG. 16 is a logical diagram of an XML delivery system in accordance with an embodiment of the present invention.

As shown in FIG. 16, textual and numeric data is generated in a Content Generation System 110 and delivered via a messaging protocol 115 to an XML document delivery system 100, such as the input documents shown in the prior examples. In accordance with an embodiment of the present invention, the system includes a TPF 1040 that filters and packages the content for delivery to a plurality of subscribers. The XML delivery system 100 is implemented on a computerized messaging platform, such as IBM WebSphere Message Broker®. The XML delivery system 100 communicates with the Subscriber hosts 150,155,160, 165 using an IP based messaging protocol 115 such as IBM WebsSphere MQ®. The system may include one or more servers including a dedicated and/or virtual server having memory therein.

Figure 17:
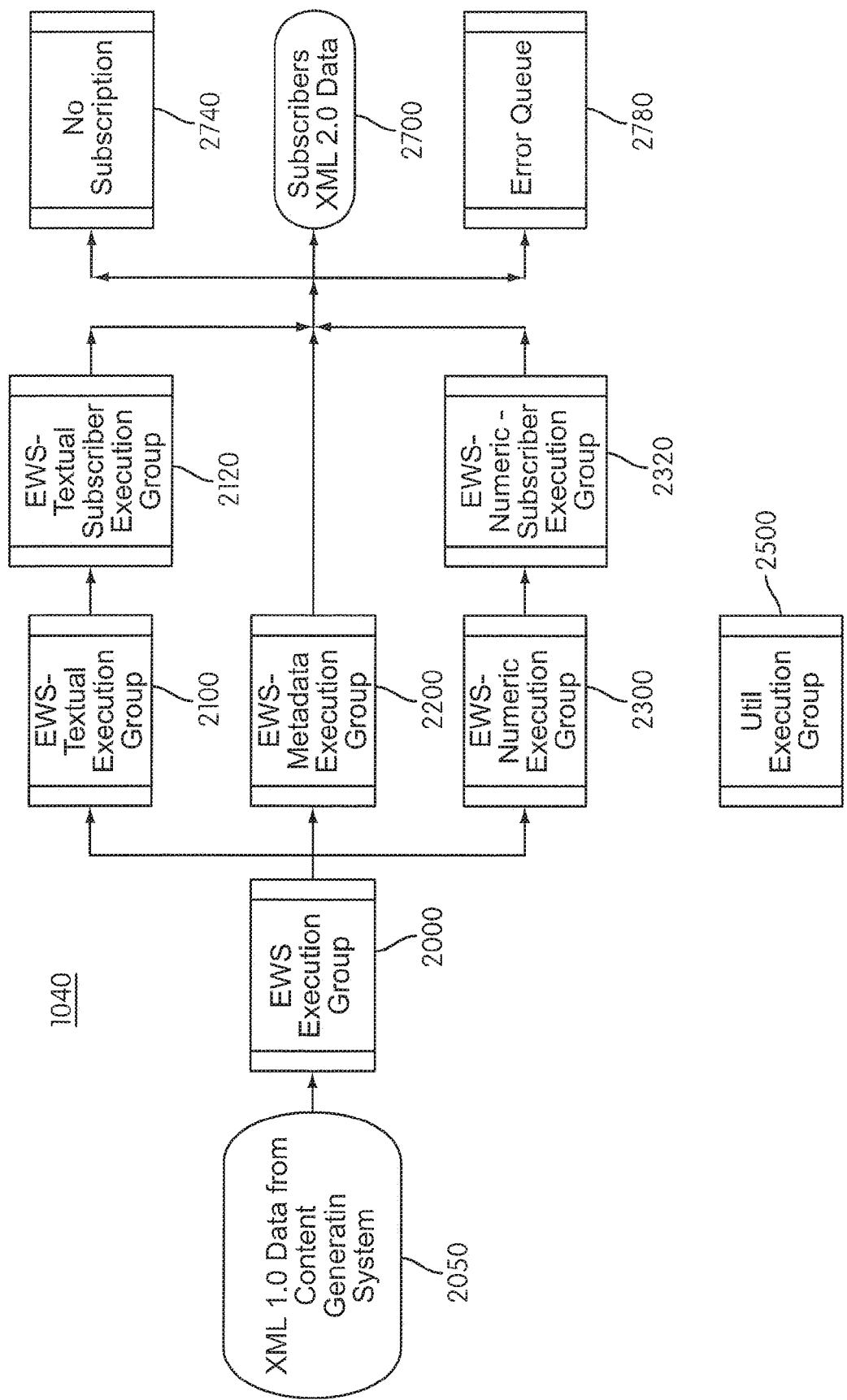
FIG. 17 is a logical diagram of the Execution Groups in an XML delivery system in accordance with an embodiment of the present invention.

According to an embodiment of the present invention and as illustrated in FIG. 17, textual and numeric data from the Content Generation System 110 are sent to the XML Data Feed queue 2050 on the TPF 1040. Each Execution Group shown in FIG. 17 contains named groupings of message flows in the XML delivery system 100. In this example, a message flow may be understood as a sequence of nodes, i.e. processing steps, that run on the XML delivery system 100 when an input message is received. On the XML delivery system 100, a node represents a set of actions that define a processing step. In this configuration, the delivery system 100 allows for multiple data types, such as XML textual messages 122, XML price messages 124, and XML metadata messages 126, to be processed simultaneously and yet still maintain the correct sequential order. The message flows can process the multiple data types by filtering the incoming message types (see FIGS. 10, 11, 12).

FIG. 17 depicts the execution groups of an exemplary TPF engine 1040 according to an embodiment of the present invention. The execution groups include the EWS Execution Group 2000, the EWS-Textual Execution Group 2100, the EWS-Textual-Subscriber Execution Group 2120, the EWS-Metadata Execution Group 2200, the EWS-Numeric Execution Group 2300, the EWS-Numeric-Subscriber Execution Group 2320, and a Utility Execution Group 2500. The execution groups may then route data to a no subscription node 2740, subscribers XML 2.0 data node 2700, and/or an error queue 2780.

The EWS Execution Group 2000 sorts the data from the XML Data Feed queue 205 by determining its type and routing it to the correct queue. First the message type is identified (i.e., textual, numeric, or metadata), then the message is routed to the corresponding node for that message type, with specific tags determining the fulfillment criteria. If there are any errors in the XML tag structure, the messages are sent to the error queue and no further processing is done.

Figure 18:
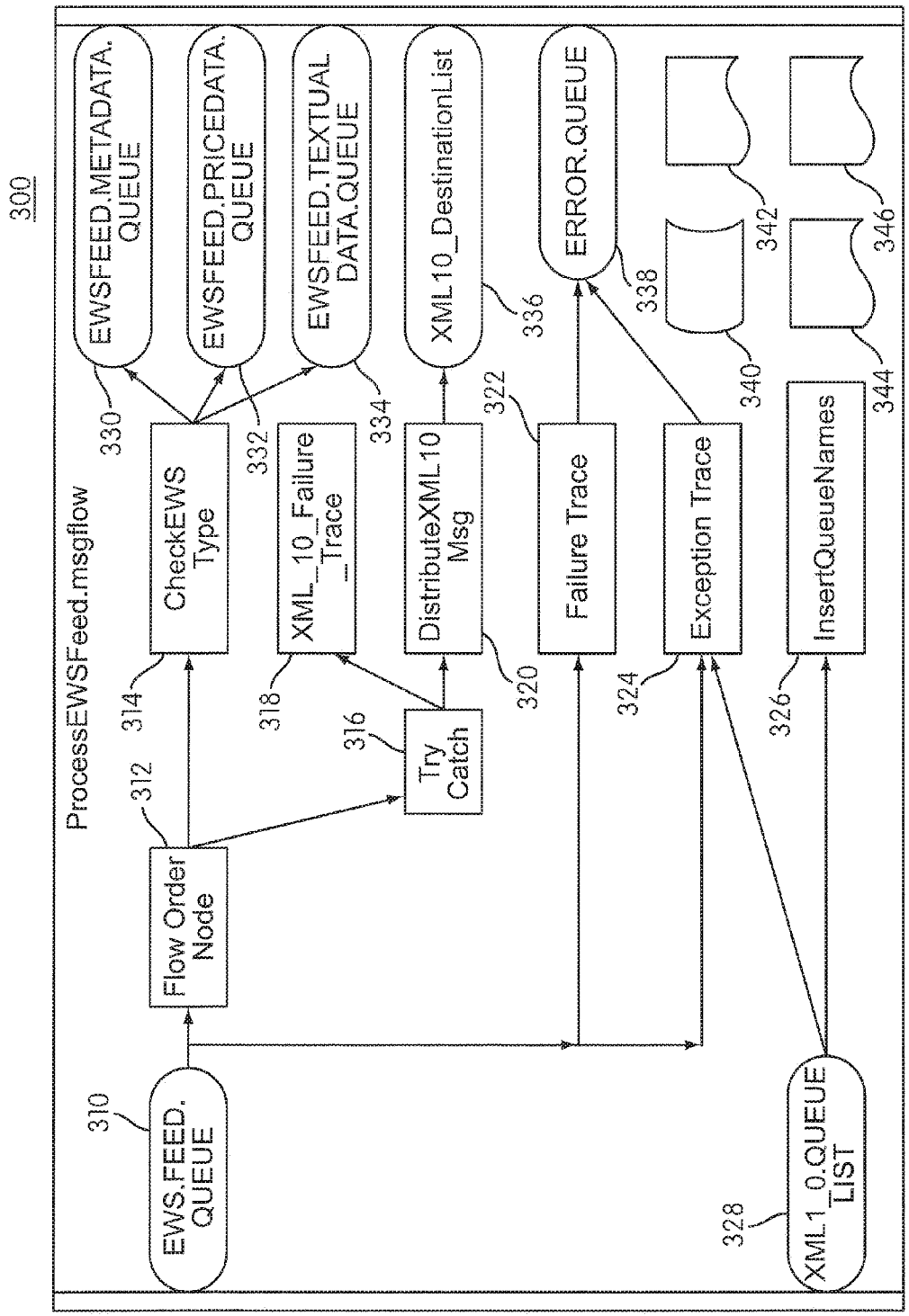
FIG. 18 is a logical diagram of a ProcessEWSFeed Message Flow in accordance with an embodiment of the present invention.

As shown in FIG. 17, The EWS Execution Group 2000 is the entry point for received messages, such as XML 1.0 messages produced by the Content Generation System 110. A flow, ProcessEWSFeed.msgflow 300, which is diagrammed in FIG. 18, is the primary message flow in the EWS Execution Group. The main function of the ProcessEWSFeed.msgflow 300 is to determine which type of XML 1.0 message (i.e., textual, numeric, or metadata) has been received, after which the message is sent to the respective message queue. According to an embodiment of the present invention, the messages may be processed in a series of nodes. For example, messages may be processed in fifteen nodes within the ProcessEWSFeed.msgflow 300 as follows:

Node 1. EWSFEED.QUEUE 310—This is the input node where XML 1.0 messages are received from the Content Generation System 110.

Node 2. FlowOrder 312—This node determines which order to process incoming messages, based on, for instance, order of receipt, content, key-words, or specific tags in the incoming message.

Node 3. DistributeXML10Msg 320—This node sends copies of XML 1.0 messages to XML 1.0 Subscribers.

Node 4. XML10_DestinationList 336—This is an output node which acts as a destination list where XML 1.0 messages are sent from the DistributeXML10Msg node 320.

Node 5. TryCatch 316—This node processes exceptions, if any, occurring in the DistributeXML10Msg node 320.

Node 6. XML10 Failure Trace 318—This node logs exception messages related to XML 1.0 message processing to a log file, such as xml10-Failure-Trace.log 342.

Node 7. CheckEWSType 314 (see also FIG. 4)—This is a sub message flow which determines the type of XML 1.0 message and routes the message to the appropriate node. Textual messages, which may be determined by the presence of  tag, are routed to theEWSFEED.TEXTUAL-DATA.QUEUE 334. Price messages, which may be determined by the presence of <num> tag, are checked for pricing errors and routed to EWSFEED.PRICEDATA.QUEUE 332. Metadata messages are checked for metadata errors and routed to EWSFEED.METADATA.QUEUE 330.

Node 8. EWSFEED.METADATA.QUEUE 330—This is the output node to store metadata messages.

Node 9. EWSFEED.PRICEDATA.QUEUE 332—This is the output node to store numeric messages.

Node 10. EWSFEED.TEXTUALDATA.QUEUE 334—This is the output node to store textual messages.

Node 11. XML1_0.QUEUE.LIST 328—This is the input queue to load the XML1_0.QUEUE.LIST 340 Subscriber list file to the database table XML1_0.QUEUES 342. If the XML 1.0 Subscriber list needs to be updated, the feed file will be stored in this queue.

Node 12. InsertQueueNames 326—This node parses the XML 1.0 Subscriber feed list 340 stored in the XML1_0.QUEUES queue 328 and inserts the data into the XML1_0.QUEUES database table 342.

Node 13. Failure Trace 322—This node logs failure messages to a file such as Failure-Trace.log 344.

Node 14. Exception Trace 324—This node logs exception messages to a file such as ews-Exception-Trace.log 346.

Node 15. ERROR.QUEUE 338—This is the output node to store failure messages.

Figure 19:
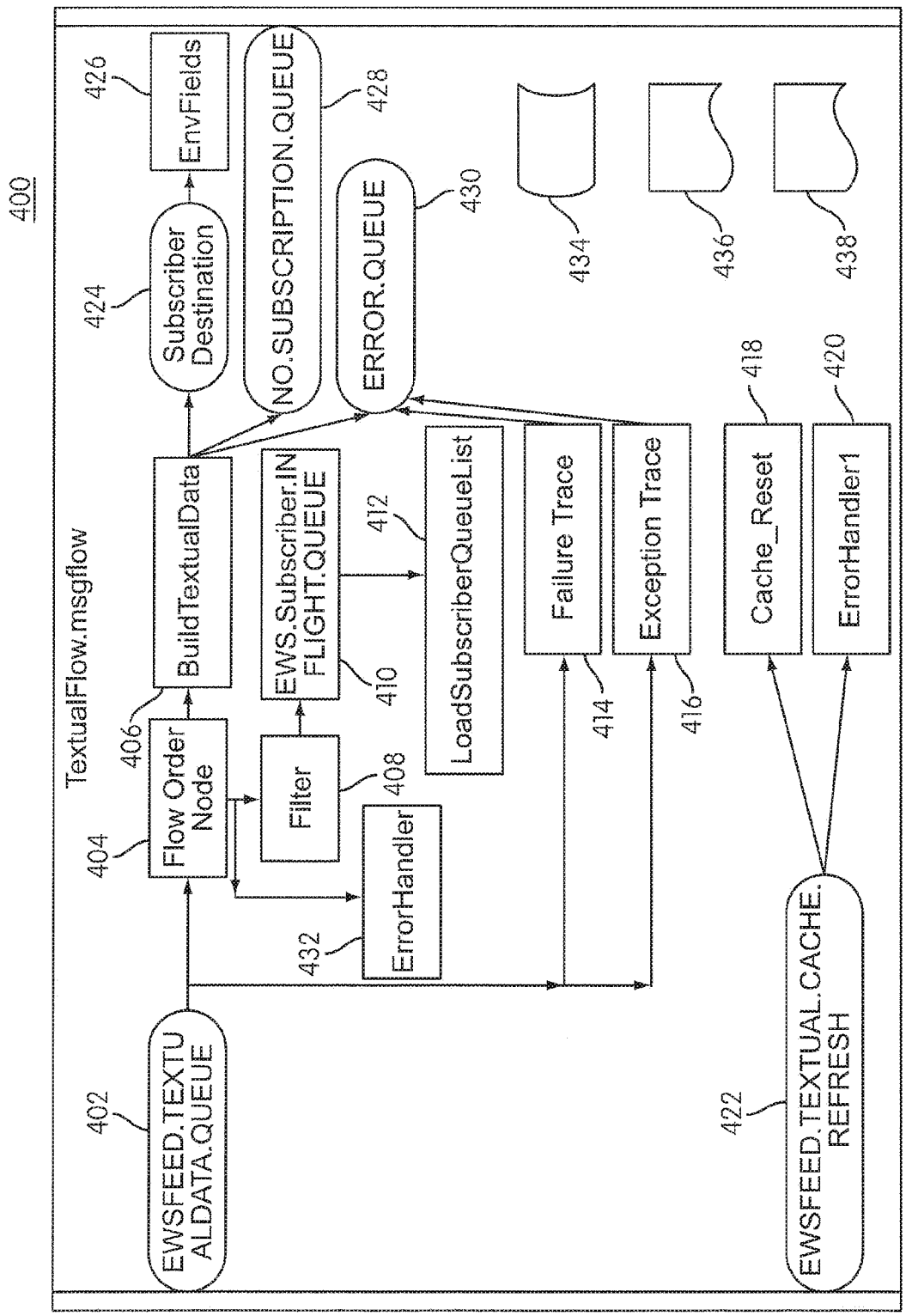
FIG. 19 is a logical diagram of a TextualFlow Message Flow in accordance with an embodiment of the present invention.

Textual messages, such as the input message shown above, are routed to a textual data queue. According to a further aspect of the present invention, as shown in FIG. 19, the EWS-Textual Execution Group 2100 processes the textual XML 1.0 messages within the TextualFlow.msgflow message flow 400. The TextualFlow.msgflow message flow 400 receives XML 1.0 messages from the EWS Execution Group 2000, and then converts them to XML 2.0 format. The XML 2.0 messages are then distributed to Subscriber queues 150, 155, 160, 165. Within the TextualFlow.msgflow message flow 400, messages can be processed in a series of nodes. For example, messages can be processed in sixteen nodes:

Node 1. EWSFEED.TEXTUALDATA.QUEUE 402—This is the input node which receives textual XML 1.0 messages from the ProcessEWSFeed message flow 300.

Node 2. FlowOrder 404—This node determines the order in which incoming messages are processed. First a subscriber queue list, such as SubscriberQueueList file 434, is loaded. If the SubscriberQueueList file 434 is null, the system builds the XML 2.0 messages and distributes them to the Subscriber queues.

Node 3. Filter 408—This node checks whether the Subscriber queue list is null.

Node 4. EWS.SUBSCRIBER.INFLIGHT.QUEUE 410—This node retrieves messages from EWS.SUBSCRIBER.INFLIGHT.QUEUE, which holds the Subscriber queue list in XML format.

Node 5. LoadSubscriberQueueList 412—When the Subscriber queue list is null while processing a message, this node loads the Subscriber queue list.

Node 6. BuildTextualData 406—This node transforms XML 1.0 messages to XML 2.0 messages and then sends the messages to the Subscriber processing queues.

Node 7. Subscriber Destination 424—This is the output node, which sends transformed XML 2.0 messages to subscriber-specific sub-flow nodes.

Node 8. EnvFields 426—This is a sub-flow node which saves environment fields.

Node 9. Failure Trace 414—This node logs failure messages to a log file, such as ews-Textual-Failure-Trace.log 436.

Node 10. Exception Trace 416—This node logs exception messages to a log file, such as ews-Textual-Exception-Trace.log 438.

Node 11. ERROR.QUEUE 430—This node is the output queue, which is used to store error messages.

Node 12. NO.SUBSCRIPTION.QUEUE 428—This node is an output queue used to store messages which have not been subscribed to by the Subscribers 150, 155,160, 165.

Node 13. ErrorHandler 432—This is a sub flow node used to process errors.

Node 14. EWSFEED.TEXTUAL.CACHE.REFRESH 422—This is the input node to refresh cache data.

Node 15. Cache Reset 418—This node is responsible for resetting the cache.

Node 16. ErrorHandler1 420—This is an error handler sub message flow for processing errors.

Figure 20:
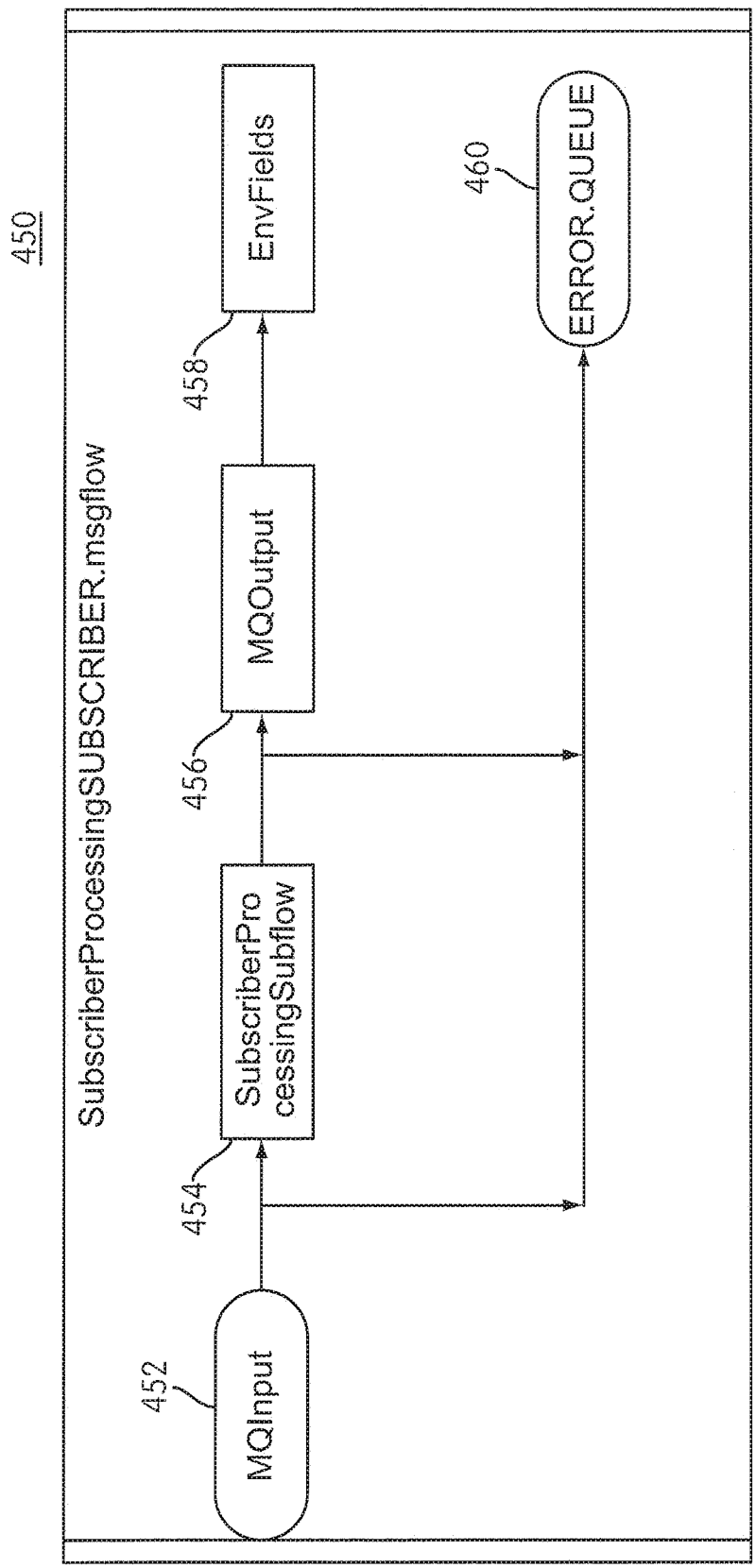
FIG. 20 is a logical diagram of a SubscriberProcessing Message Flow in accordance with an embodiment of the present invention.

The EWS-Textual-Subscriber Execution Group 2120 contains subscriber-specific message flows for processing textual messages. According to an aspect of the present invention, there may be a plurality of subscriber specific message flows. FIG. 20 shows an exemplary message flow to a specific subscriber, SubscriberProcessingSUBSCRIBER.msgflow 450. This message flow receives XML 2.0 messages from the EWS-Textual message flow 400 and then applies subscriber-specific logic to the message flow, before distributing it to the Subscriber queue. Within the SubscriberProcessingSUBSCRIBER.msgflow 450, messages may be processed in five nodes:

Node 1. MQinput 452—This is an input node for processing textual messages from a specific Subscriber.

Node 2. SubscriberProcessingSubFlow 454—This message sub-flow executes Subscriber-specific logic.

Node 3. MQOutput—This is the output node for a specific Subscriber.

Node 4. ERROR.QUEUE 460—This is the output queue used to store error messages.

Node 5. EnvFields 458—This is the message sub-flow used to populate environmental fields.

Figure 21:
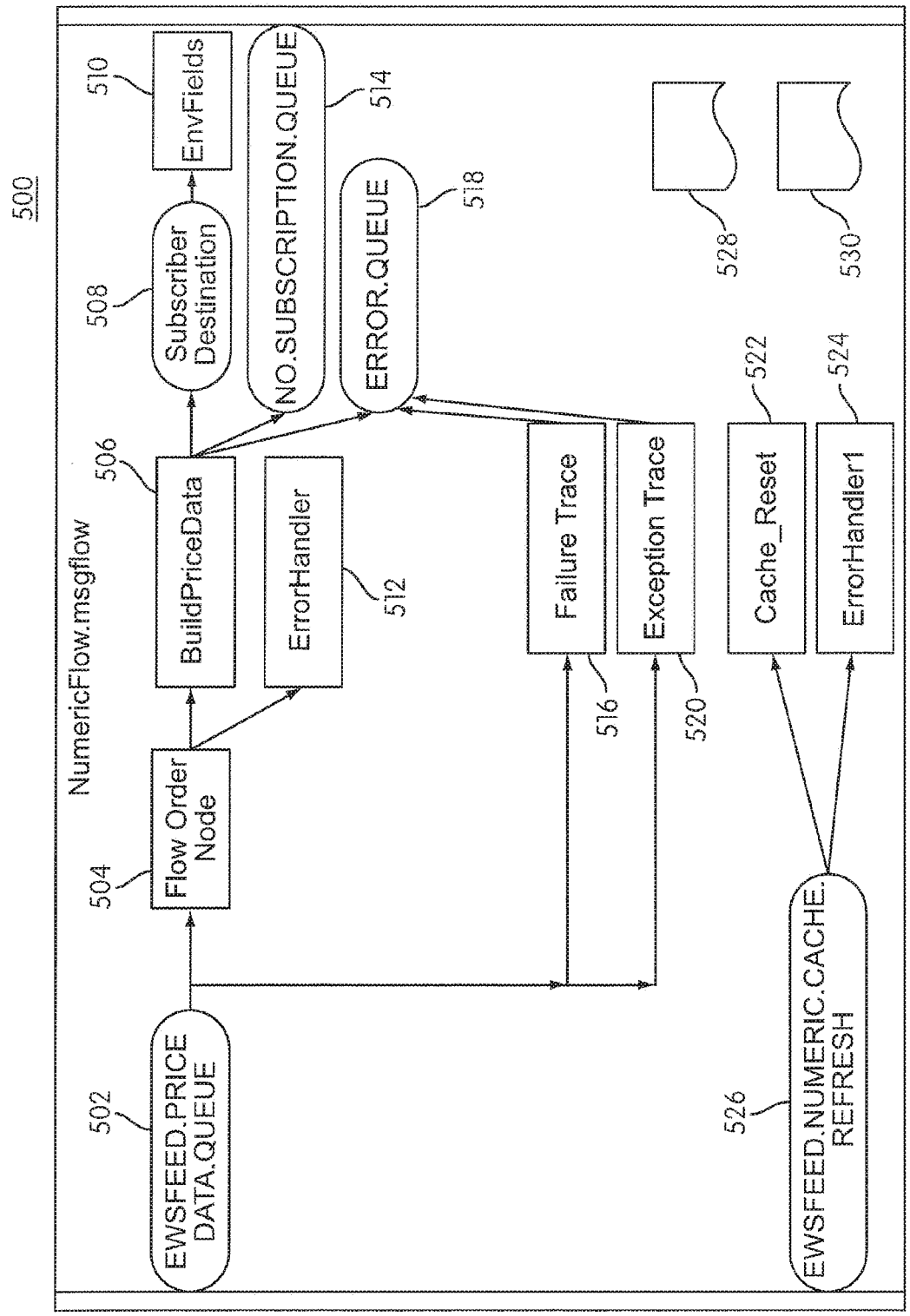
FIG. 21 is a logical diagram of a NumericFlow Message Flow in accordance with an embodiment of the present invention.

Numeric messages, such as the input message shown above, are routed to a numeric data execution group, as shown in FIG. 17. According to a further aspect of the present invention, the Numeric Execution Group 2300 processes numeric XML 1.0 messages using the Numeric-Flow.msgflow 500 as shown in FIG. 21. The Numeric-Flow.msgflow 500 receives XML 1.0 messages from the Content Generation System 110 and then converts them to XML 2.0 format, where they can be distributed to the Subscriber queues. Within the NumericFlow.msgflow 500, messages may be processed in thirteen nodes:

Node 1. EWSFEED.PRICEDATA.QUEUE 502—This is the input node for numeric XML 1.0 messages which are received from ProcessEWSFeed.msgflow 300 (FIG. 18).

Node 2. FlowOrder 504—This node determines in which order to process the incoming messages, based on, for instance, order of receipt, content, key-words, or specific tags in the incoming message.

Node 3. BuildPriceData 506—This node transforms XML 1.0 messages to XML 2.0 message and then sends them to the Subscriber processing queues.

Node 4. Subscriber Destination 508—This is the output node which sends transformed XML 2.0 messages to the Subscriber queues.

Node 5. EnvFields 510—This is a sub message flow which populates environment fields.

Node 6. Failure Trace 516—This node logs failure messages to a log file such as ews-Numeric-Failure-Trace.log 528.

Node 7. Exception Trace 520—This node logs exception messages to a log file such as ews-Numeric-Exception-Trace.log 530.

Node 8. ERROR. QUEUE 518—This node is the output queue to store error messages.

Node 9. NO.SUBSCRIPTION.QUEUE 514—This node is the output queue to store messages for which there are no Subscribers.

Node 10. ErrorHandler 512—This is a sub message flow to process errors.

Node 11. EWSFEED.NUMERIC.CACHE.REFRESH 526—This is an input node for refreshing the data cache.

Node 12. Cache Reset 522—This node will reset the cache.

Node 13. ErrorHandler1 524—This is the error handler sub message flow for processing errors.

Figure 22:
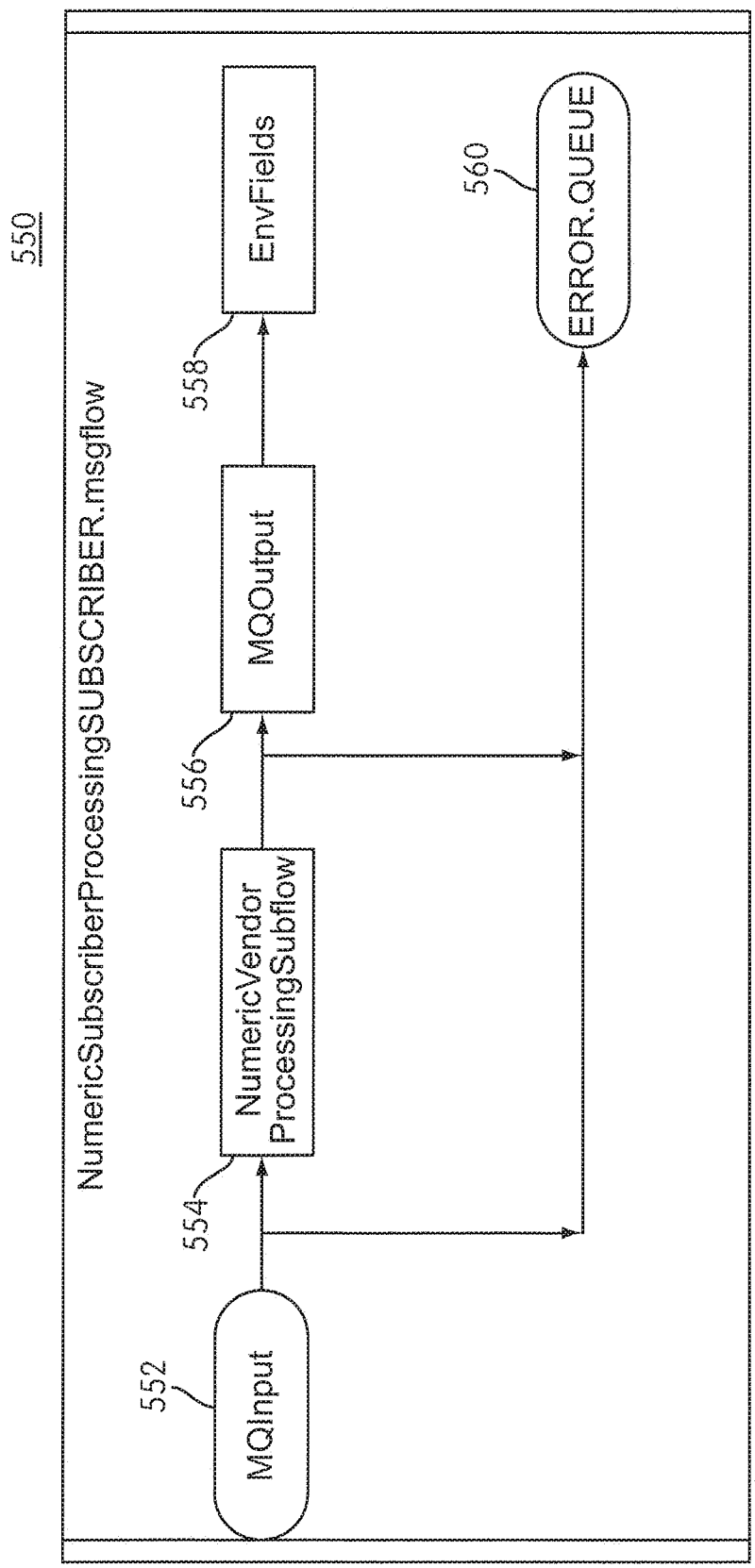
FIG. 22 is a logical diagram of a NumericSubscriberProcessing Message Flow in accordance with an embodiment of the present invention.

According to an aspect of the present invention, there may be a plurality of subscriber specific message flows. FIG. 22 shows an exemplary message flow to a specific subscriber, NumericSubscriberProcessingSUBSCRIBER.msgflow 550. This message flow receives XML 2.0 messages from the NumericFlow.msgflow 500 and then applies subscriber-specific logic to the message flow, before distributing it to the Subscriber queue. Within the NumericSubscriberProcessingSUBSCRIBER.msgflow 550, messages may be processed in five nodes:

Node 1. MQinput 552—This is an input node for processing numeric messages from a specific Subscriber.

Node 2. NumericVendorProcessingSubFlow 554—This message sub-flow executes Subscriber-specific logic, such that unique packages may be built for each subscriber.

Node 3. MQOutput 556—This is the output node for a specific Subscriber.

Node 4. ERROR.QUEUE 560—This is the output queue used to store error messages.

Node 5. EnvFields 558—This is the message sub-flow used to populate environmental fields.

Figure 23:
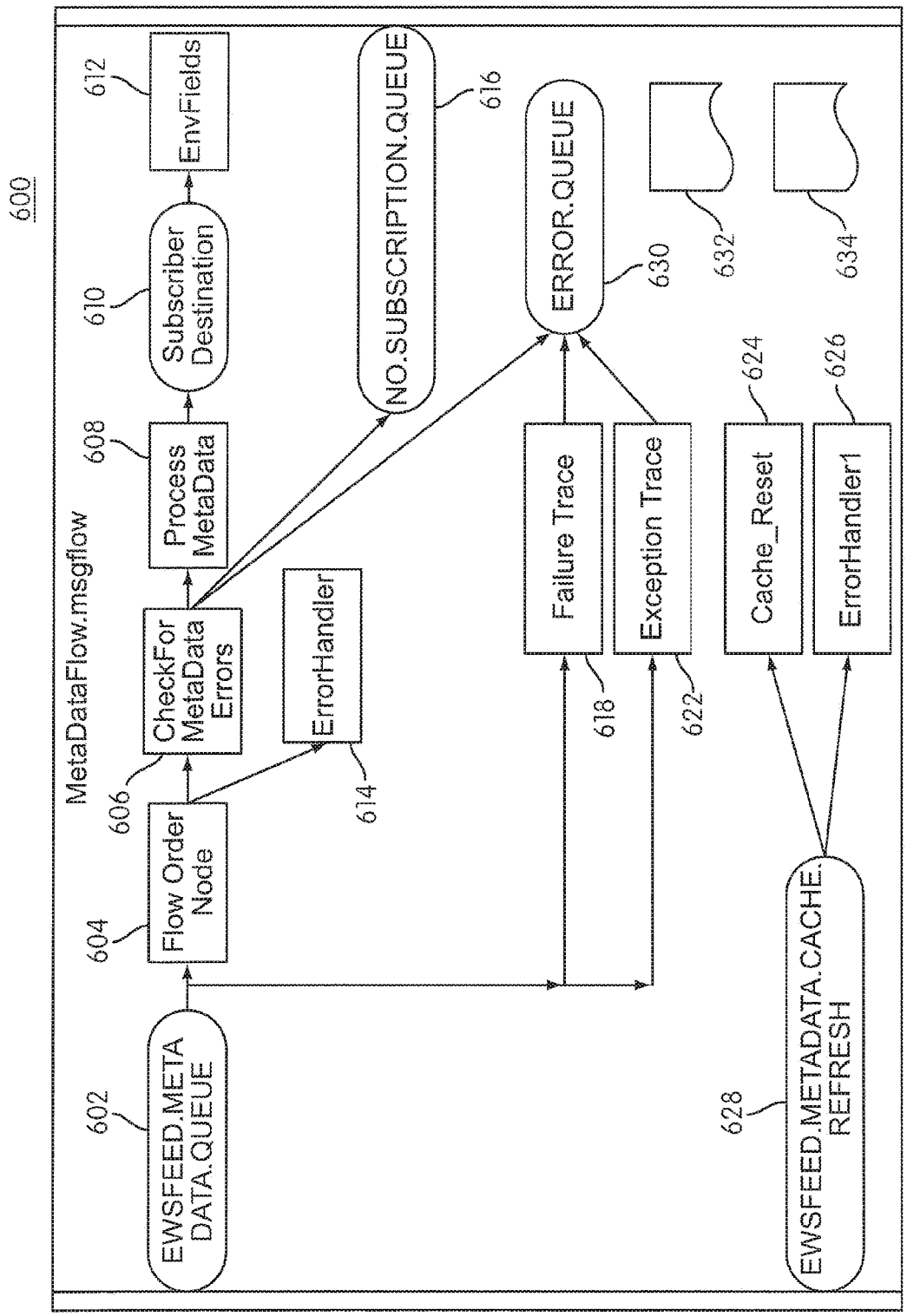
FIG. 23 is a logical diagram of a MetaDataFlow Message Flow in accordance with an embodiment of the present invention.

As shown in FIG. 23, the EWS-Metadata Execution Group 2200 is responsible for processing metadata messages using the MetaDataFlow.msgflow message flow 600. The MetaDataFlow.msgflow message flow 600 receives XML 2.0 messages as an input, converts them to metadata messages, and then periodically distributes them to Subscribers 150,155,160,165. For instance, metadata may be distributed on a weekly basis. Within the MetaDataFlow.msgflow 600, messages may be processed in fourteen nodes:

Node 1. EWSFEED.METADATA.QUEUE 602—This is the input node where metadata messages in XML 2.0 format are received from the ProcessEWSFeed.msgflow 300 (FIG. 18).

Node 2. FlowOrder 604—This node determines the order in which to process incoming messages, based on, for instance, order of receipt, content, key-words, or specific tags in the incoming message.

Node 3. CheckForMetaDataErrors 606—This node checks for errors in the incoming XML messages. Messages with errors are sent to the ERROR.QUEUE 630.

Node 4. ProcessMetaData 608—This node transforms XML 2.0 messages to metadata messages and then sends them to the Subscriber processing queues.

Node 5. Subscriber Destination 610—This is the output node which sends transformed XML 2.0 messages to the Subscriber queues.

Node 6. EnvFields 612—This is a message sub-flow, which populates environment fields.

Node 7. Failure Trace 618—This node logs failure messages to a log file, such as ews-MetaData-Failure-Trace.log 632.

Node 8. Exception Trace 622—This node logs exception messages to a log file, such as ews-MetaData-Exception-Trace.log 634.

Node 9. ERROR.QUEUE 630—This is the output queue for storing error messages.

Node 10. NO.SUBSCRIPTION.QUEUE 616—This is the output queue for storing messages for which there are no Subscribers.

Node 11. ErrorHandler 614—This is a sub message flow for processing errors.

Node 12. EWSFEED.METADATA.CACHE.REFRESH 628—This is the input node for refreshing the data cache.

Node 13. Cache Reset 624—This node resets the cache.

Node 14. ErrorHandler1 626—This is the error handler sub message flow for processing errors.

According to another aspect of the present invention, the TPF further includes a Utility Execution Group 2500, which is directed to managing partner or subscriber queues and permissioning, for example, as shown in FIG. 17. In this example, the Utility Execution group contains five message flows.

Figure 24:
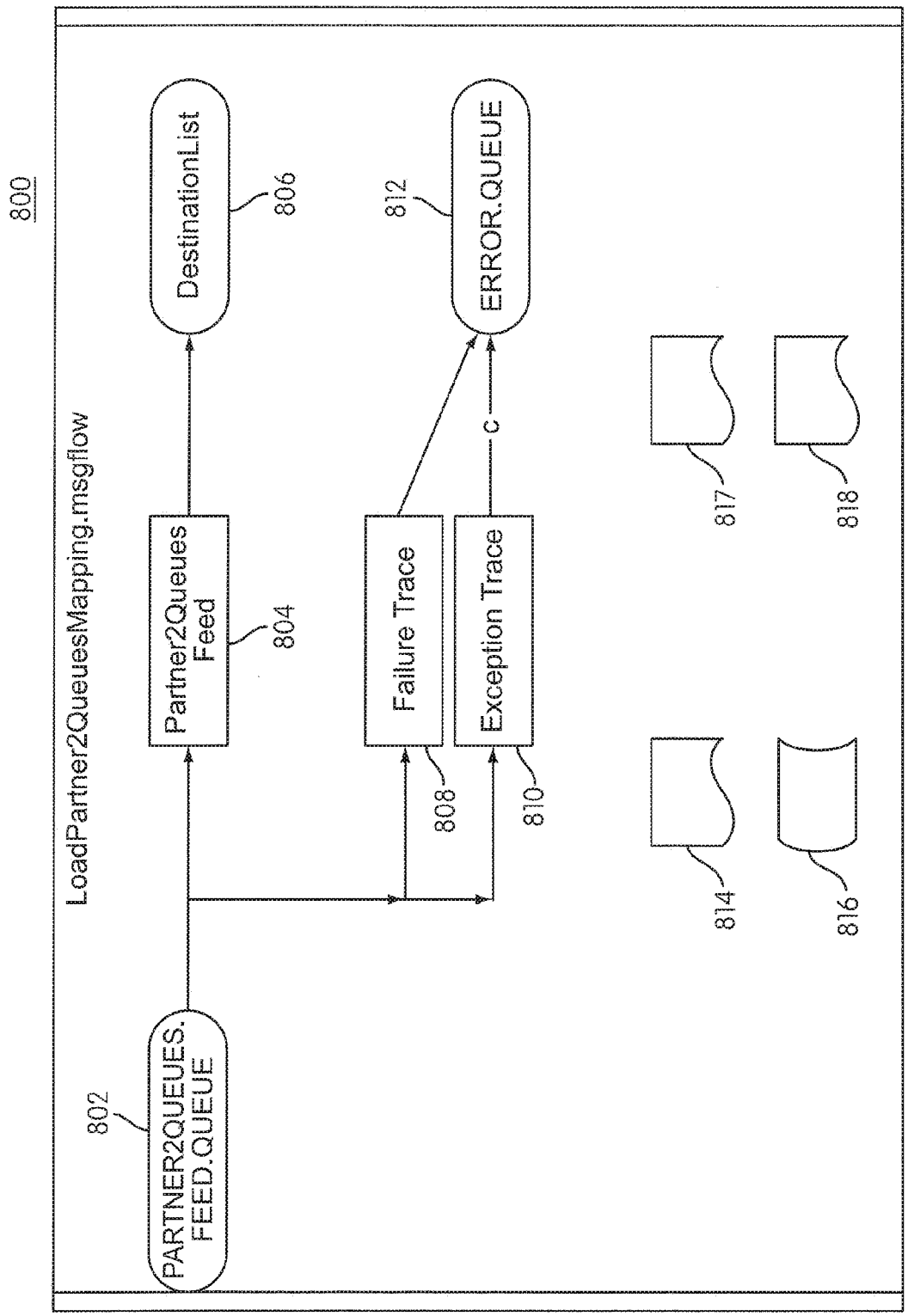
FIG. 24 is a logical diagram of a LoadPartner2QueuesMapping Message Flow in accordance with an embodiment of the present invention.

The first is the LoadPartner2QueuesMapping.msgflow message flow 800, shown in FIG. 24. The LoadPartner2QueuesMapping.msgflow 800 inserts the data from the PARTNER2QUEUES mapping file 814 into the PARTNER2QUEUES database table 816. A sample of the PARTNER2QUEUES mapping file 814 is as follows:
CSQUARE|CSQRP1
TICHINA|TICHINA
Within the LoadPartner2QueuesMapping.msgflow message flow 800 are six nodes:

Node 1. PARTNER2QUEUES.FEED.QUEUE 802—This node is the input node.

Node 2. Partner2QueuesFeed 804—This node loads the data from the PARTNER2QUEUES mapping file 814 and inserts it into the PARTNER2QUEUES database table 816.

Node 3. DestinationList 806—This node writes to the EWSFEED.TEXTUAL.CACHE.REFRESH node 422, shown in FIG. 19, to refresh the data cache.

Node 4. Failure Trace 808—This node logs the failure messages to a file, such as ews-Failure-Trace.log 817.

Node 5. Exception Trace 810—This node logs the exception messages to a file, such as ews-Exception-Trace.log 818.

Node 6. ERROR.QUEUE 812—This is the output node for saving failure messages.

Figure 25:
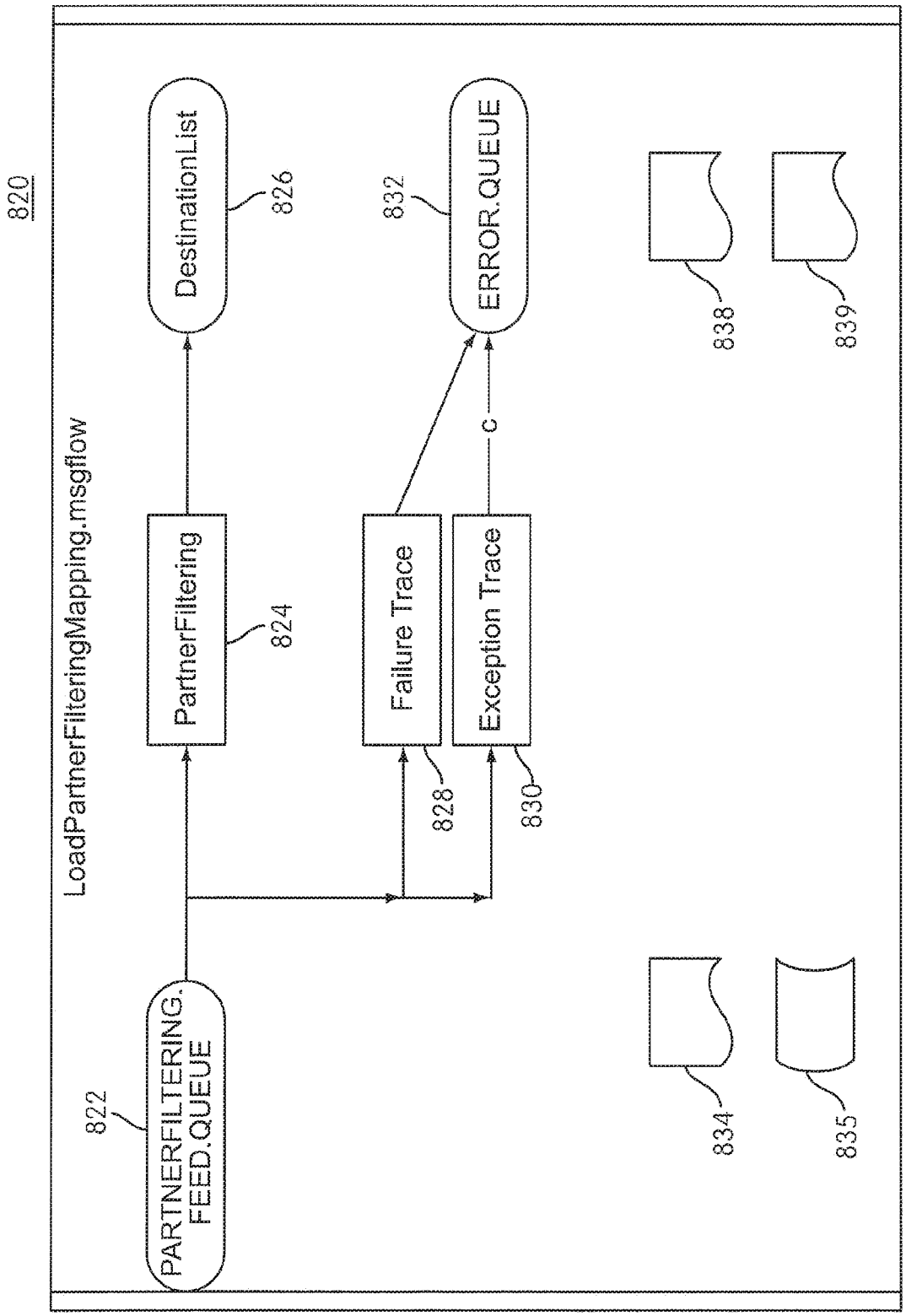
FIG. 25 is a logical diagram of a LoadPartnerFilteringMapping Message Flow in accordance with an embodiment of the present invention.

The second message flow also within the Utility Execution Group 2500 is LoadPartnerFilteringMapping.msgflow, shown in FIG. 25. This flow inserts the data from the input file into the PARTNER_FILTERING database table 835. A sample of the input file data is as follows:
REUTERS|CORRECTION_TAG|SEND
BLOOMBERG|CORRECTION_TAG|SEND
Within the LoadPartnerFilteringMapping.msgflow message flow 820 are six nodes:

Node 1. PARTNERFILTERING.FEED.QUEUE 822—This is the input node, which receives the data from the input file.

Node 2. Partnerfiltering 824—This node loads the data from the PARTNER_FILTERING mapping file 834 and inserts it into the PARTNER_FILTERING database table 835.

Node 3. Destination List 826—This node writes to EWSFEED.TEXTUAL.CACHE.REFRESH node 422, shown in FIG. 19, to refresh the data cache.

Node 4. Failure Trace 828—This node logs the failure messages to a file, such as ews-Failure-Trace.log 838.

Node 5. Exception Trace 830—This node logs the exception messages to a file, such as ews-Exception-Trace.log 839.

Node 6. ERROR.QUEUE 832—This is the output node for saving failure messages.

The third message flow within the Utility Execution Group 2500 is Load Permission File message flow for example, as shown in FIG. 6. LoadPermissionFile.msgflow 840 inserts the data from the PERMISSIONS input file 857 into the PERMISSIONS database table 858.

A sample of the PERMISSIONS input file 857 data is as follows:
EWS_ALL|BACKUP
AA|CSQRP1
AE|CSQRP1
Within the LoadPermissionFile.msgflow message flow 840 are six nodes:

Node 1. PERMISSIONS.FEED.QUEUE 842—This is the input node, which receives the data from the PERMISSIONS input file 857 file.

Node 2. BuildPermissionTags 848—This node loads the data from the mapping file and inserts it into the PERMISSIONS database table 858.

Node 3. DestinationList 850—This node writes the permission data to EWSFEED.TEXTUAL.CACHE.REFRESH 422 (FIG. 19), EWSFEED.NUMERIC.CACHE.REFRESH 526 (FIG. 21), and EWSFEED.METADATA.CACHE.REFRESH 628 (FIG. 23), thereby refreshing the data cache.

Node 4. Failure Trace 852—This node logs the failure messages to a file, such as ews-Failure-Trace.log 855.

Node 5. Exception Trace 854—This node logs the exception messages to a file, such as ews-Exception-Trace.log 857.

Node 6. ERROR.QUEUE 856—This is the output node for saving failure messages.

This flow may also include a filtering node 846, which filters data received from input file 857 prior to uploading at node 848.

Figure 26:
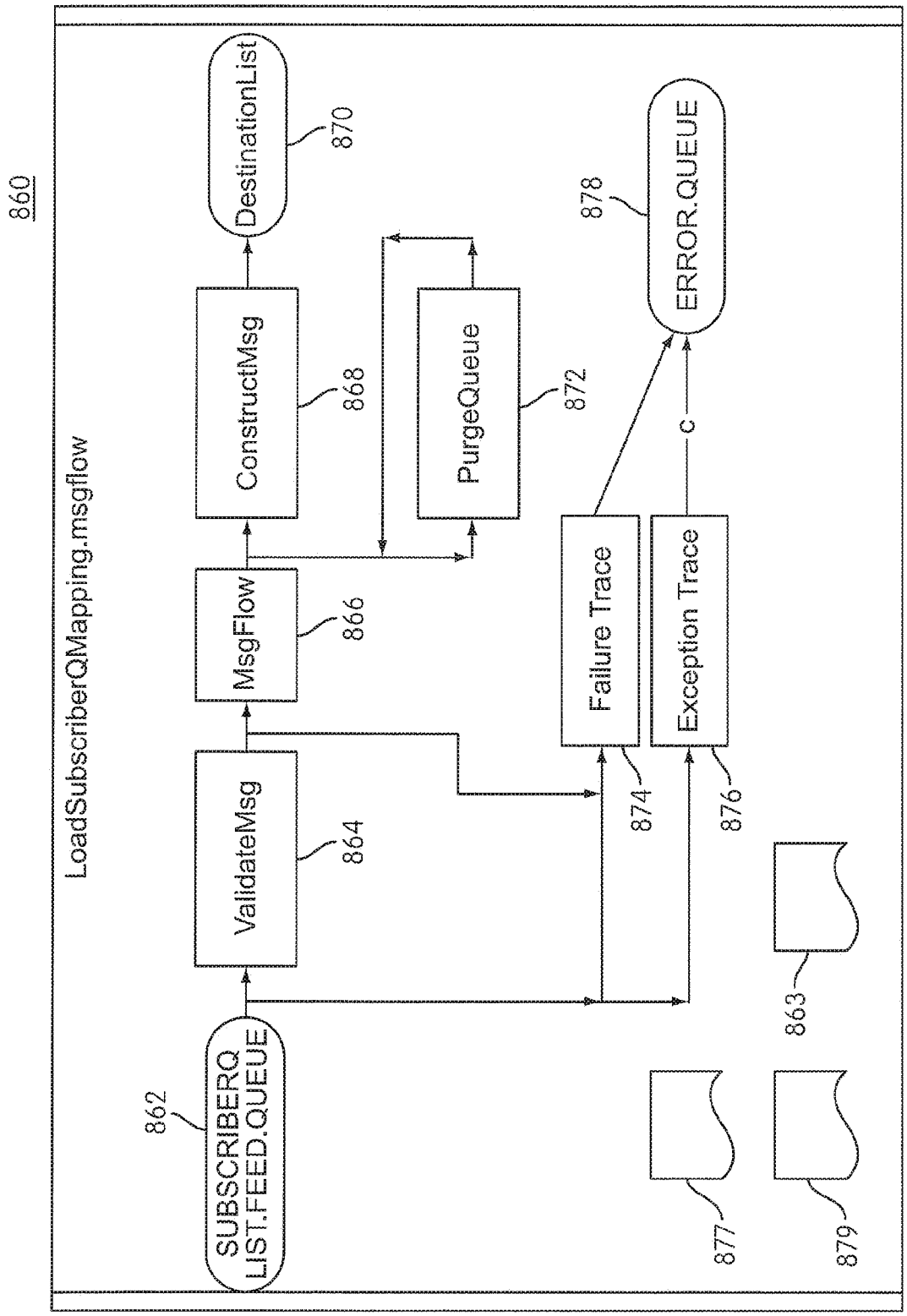
FIG. 26 is a logical diagram of a LoadSubscriberQMapping Message Flow in accordance with an embodiment of the present invention.

The fourth message flow within the Utility Execution Group 2500 is LoadSubscriberQMapping.msgflow 860, shown in FIG. 26. This message flow inserts the data from a VendorQMapping input file 863 into the EWS.SUBSCRIBER.INFLIGHT.QUEUE 410, shown in FIG. 19. A sample of the VendorQMapping input file 863 input file data is as follows:
CSQUARE.VO.QL|CSQRP1
TICHINA.VO.QL|TICHINA
Within the LoadVendorQMapping.msgflow message flow 860 are eight nodes:

Node 1. VENDORQLIST.FEED.QUEUE 862—This is the input node, which receives the data from the VendorQMapping input file 863 file.

Node 2. ValidateMsg 864—This node validates the configuration of the input data format by checking whether it is in the correct format, for instance "VENDORQ|VENDOR."

Node 3. ConstructMsg 868—This message flow constructs the message with a Subscriber Tag, such as:

```
<subscriber>
<mqQName>CSQUARE.VO.QL</mqQName>
<vendorName>CSQRD1</vendorName>
</vendor>
```

Node 4. DestinationList 870—This node writes to EWSFEED.TEXTUAL.CACHE.REFRESH node 422, shown in FIG. 19, thereby refreshing the cache data.

Node 5. PurgeQueue 872—The EWS.SUBSCRIBER.INFLIGHT.QUEUE queue is mapped to receive the constructed message.

Node 6. Failure Trace 874—This node logs the failure messages to a file, such as ews-Failure-Trace.log 877.

Node 7. Exception Trace 876—This node logs the exception messages to a file, such as ews-Exception-Trace.log 879.

Node 8. ERROR. QUEUE 878—This is the output node for saving failure messages.

This flow may also include an additional message flow control node, 866.

Figure 27:
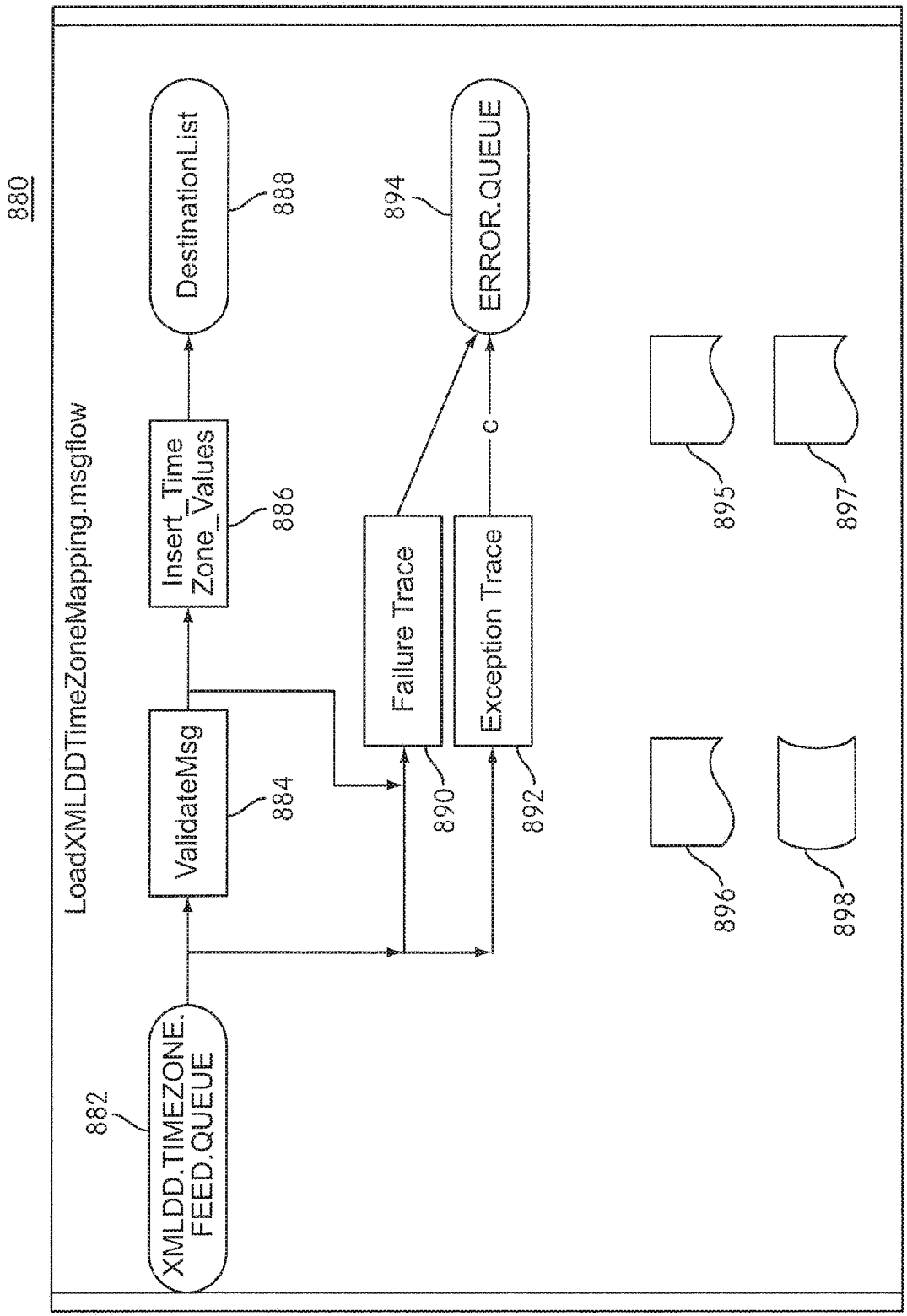
FIG. 27 is a logical diagram of a LoadXMLDDTimeZoneMapping Message Flow in accordance with an embodiment of the present invention.

LoadXMLDDTimeZoneMapping.msgflow 880 is the fifth message flow contained within the Utility Execution Group 2500 and is shown in FIG. 27. This message flow inserts the data from the input file transfers into the XMLDD_TIMEZONE_MAPPING file 896. A sample of the XMLDD_TIMEZONE_MAPPING input file 896 data is as follows:
MST|US/Mountain
PST|US/Pacific
GMT|Etc/Zulu
Within the LoadXMLDDTimeZoneMapping.msgflow message flow 880 are seven nodes:

Node 1. XMLDD.TIMEZONE.FEED.QUEUE 882—This is the input node, which receives the data from the input mapping file.

Node 2. ValidateMsg 884—This node validates the input data in the XMLDD-TIMEZONE-MAPPING input file 896 configuration file, and checks for invalid conditions, such as an empty file or invalid data format.

Node 3. Insert_TimeZone Values 886—This node inserts data into the table XMLDD_TIMEZONE_MAPPING 898 and updates the log.

Node 4. DestinationList 888—This node writes to EWS-FEED.NUMERIC.CACHE.REFRESH node 526, shown in FIG. 21, thereby refreshing the cache data.

Node 5. Failure Trace 890—This node logs the failure messages to a file, such as ews-Failure-Trace.log 895.

Node 6. Exception Trace 892—This node logs the exception messages to a file, such as ews-Exception-Trace.log 897.

Node 7. ERROR.QUEUE 894—This is the output node for saving failure messages.

Exemplary output messages in accordance with the above described example are shown in FIGS. 28 and 29. FIG. 28 shows an exemplary Price Assessment output message, while FIG. 29 shows an exemplary News Story output message.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A computerized method for delivering messages to a plurality of subscribers, the method comprising the steps of:
receiving, at a computerized delivery system, a plurality of incoming data messages from one or more content providers, the received messages in XML having a first message format;
identifying a content type of at least one of said received messages, wherein said received messages comprise numerical data, textual data, news metadata, or analytics metadata;
checking at least one of said plurality of incoming data messages for errors; forwarding a message to an error queue;
building audit messages including error conditions, exceptions, and status conditions;
electronically logging error conditions, exceptions, and status conditions;
forwarding said received message to at least one processing node within the delivery system, wherein said at least one processing node is associated with the content type of said received message;
building a subscriber-specific content message at said processing node by:
determining a subscription permission code associated with said received message using a permissions database, wherein the subscription permission code comprises 2 or 3 alphanumeric digits for grouping at least two symbols associated with the content type; and
transforming the format of said received message from the first message format to a second message format, wherein the second message format is different from the first message format;
authorizing the delivery of the subscriber-specific content message to at least one of a plurality of said subscribers based on said permission code; and
delivering said subscriber-specific content message to at least one of said subscribers in real-time.

2. The method of claim 1, wherein message processing within the delivery system is organized into execution groups, message flows, and nodes.

3. The method of claim 2, wherein the delivery system further includes a metadata message execution group, a numeric message execution group, and a textual message execution group.

4. The method of claim 1, wherein the step of checking messages for errors further includes checking numeric messages for missing pricepoint, symbol, datapoint, permcode, datetime, bate, trans attributes, or permission tags.

5. The method according of claim 1, wherein the incoming data messages are comprised of XML market data with pre-defined sets of tags.

6. The method of claim 5, wherein said incoming messages are in XML 1.0 format, and said delivered messages are in XML 2.0 format.

7. The method of claim 1, wherein the step of identifying the type of at least one of said received messages is accomplished using a unique XML tag set.

8. The method of claim 1, wherein the delivered messages are customized for said at least one subscriber.

9. The method of claim 1, wherein authorizing the delivery of the subscriber-specific content message includes verifying that said at least one of said subscribers is an entity that subscribes to messages having said content type.

10. The method of claim 1, where said at least one of said subscribers is a subscribing entity that has requested market-specific alert messages.

11. The method of claim 1, wherein the content type of said received message is numerical and said processing node is specifically configured to process numerical messages.

12. The method of claim 11, wherein said received message includes a numerical tag.

13. The method of claim 1, wherein the content type of said received message is textual and said processing node is specifically configured to process textual messages.

14. The method of claim 13, wherein said received message includes a textual tag.

15. The method of claim 1, wherein the content type of said received message is news metadata and said processing node is specifically configured to process news metadata.

16. The method of claim 15, wherein said received message includes a metadata tag.

17. The method of claim 1, wherein the content type of said received message is analytics metadata and said processing node is specifically configured to process analytics metadata.

18. The method of claim 17, wherein said received message includes a metadata tag.

19. The method of claim 1, wherein said received message includes a tag indicating a commodity type or a geographic location where a news story originated.

* * * * *